(12) United States Patent
Sugiyama

(10) Patent No.: US 6,940,911 B2
(45) Date of Patent: Sep. 6, 2005

(54) VARIABLE PICTURE RATE CODING/DECODING METHOD AND APPARATUS

(75) Inventor: Kenji Sugiyama, Yokosuka (JP)

(73) Assignee: Victor Company of Japan, Ltd., Kanagawa-ken (JP)

( * ) Notice: Subject to any disclaimer, the term of this patent is extended or adjusted under 35 U.S.C. 154(b) by 730 days.

(21) Appl. No.: 09/805,255

(22) Filed: Mar. 14, 2001

(65) Prior Publication Data
US 2001/0036230 A1 Nov. 1, 2001

(30) Foreign Application Priority Data

Mar. 14, 2000 (JP) ........................ 2000-069973
Aug. 25, 2000 (JP) ........................ 2000-255170
Aug. 25, 2000 (JP) ........................ 2000-255171

(51) Int. Cl.[7] ............................................. H04N 7/12
(52) U.S. Cl. ........................... 375/240.26; 375/240.29
(58) Field of Search ..................... 375/240.21, 240.26, 375/240.29; 348/425.1, 426.1, 427.1, 431.1, 441, 445–446, 451–452

(56) References Cited

U.S. PATENT DOCUMENTS

| | | | | |
|---|---|---|---|---|
| 5,070,394 A | * | 12/1991 | Kobayashi | 348/451 |
| 5,410,356 A | * | 4/1995 | Kikuchi et al. | 348/452 |
| 5,493,338 A | * | 2/1996 | Hong | 348/441 |
| 5,510,902 A | * | 4/1996 | Fujinami et al. | 386/123 |
| 5,610,661 A | * | 3/1997 | Bhatt | 348/446 |
| 5,619,272 A | * | 4/1997 | Salmon et al. | 348/452 |
| 6,037,990 A | * | 3/2000 | Ogawa et al. | 348/452 |
| 6,069,664 A | * | 5/2000 | Zhu et al. | 348/448 |
| 6,188,725 B1 | * | 2/2001 | Sugiyama | 375/240 |
| 2003/0161404 A1 | * | 8/2003 | Wu | 375/240.16 |

OTHER PUBLICATIONS

Miyaji et al, "A Method of Entropy Predictive Frame Rate Control", KDD R&D Laboratories, pp. 27–34, Jun. 12, 1996.

* cited by examiner

Primary Examiner—Vu Le
(74) Attorney, Agent, or Firm—Jacobson Holman PLLC

(57) ABSTRACT

First pictures are coded by a variable picture rate coding, the first pictures being set at a predetermined interval, to be used as reference pictures for inter-picture prediction of an incoming moving picture and second pictures different from the first pictures are coded. The first pictures are coded by intra-picture coding or unidirectional inter-picture predictive coding, thus obtaining a first bitstream. A coding picture rate is set in accordance with motion activity of the incoming moving picture. Pictures that have remained after decimation of the second pictures are coded in accordance with the picture rate by bidirectional inter-picture predictive coding using the first pictures or locally-decoded pictures of the first pictures as the reference pictures, thus obtaining a second bitstream. The first and the second bitstreams and data indicating the picture rate are multiplexed.

2 Claims, 17 Drawing Sheets

INCOMING 60 FPS- PROGRESSIVE MOVING PICTURE

60 FPS- CODING

30 FPS- CODING

20 FPS- CODING

10 FPS- CODING 0.1 SEC.

VARIABLE PICTURE RATE CODING/DECODING METHOD AND APPARATUS

BACKGROUND OF THE INVENTION

The present invention relates to variable picture rate coding/decoding and conversion of scanning type of a video signal from interlaced scanning to progressing scanning, for example, in highly efficient coding of moving pictures into a bitstream at a small code amount for efficient video data transfer, storage and displaying, such as, MPEG-coding with inter-picture predictive coding.

Moving-picture coding at a low transfer bit rate, for example, 60 kbps, decimates several pictures from an incoming moving picture and encodes the remaining pictures according to need. An incoming moving picture carrying 30 frames per second (30 fps) is decimated, for instance, to 15, 10 or 5 fps. Decimation of pictures decreases the number of pictures, or frames, thus decreasing the amount of generated codes, although, motion smoothness on screen will be degraded a little bit.

Pictures under MPEG-coding are divided into three different types I-, P- and B-pictures. I-pictures (intra-coded pictures) are coded independently, entirely without reference to other pictures. P-pictures (unidirectionally predictive-coded pictures) are compressed by coding the differences the pictures and reference preceding I- or P-pictures. B-pictures (bidirectionally predictive-coded pictures) are also compressed by coding the differences the pictures and reference preceding or upcoming I- or P-pictures.

B-pictures can be removed from a coded bitstream for changing a picture rate because B-pictures are not used as reference pictures. A bitstream of 30 fps with P-pictures for every 3 frames, for example, can be converted into a bitstream of 10 fps by removing B-picture streams only.

A well-known variable picture rate coding performs predictive-coding for P- and B-pictures after decimation. A changed picture rate due to decimation varies a distance for prediction between a picture to be coded and a reference picture. The lower the picture rate, the longer the prediction distance, thus the amount generated codes being not so decreased.

Particularly, in MPEG, B-picture decimation causes lowering of picture rate too much, and can not change picture rate at several stages.

Moreover, for interlaced moving picture, decimation in unit of field lowers vertical resolution and decimation in unit of frame causes time reversal due to frame interpolation.

Decimation in unit of field or frame for varying picture rate is thus not applicable to an interlaced moving picture.

Although it is applicable to progressive moving picture, several scanning lines are decimated in reproduction by interlaced scanning.

This decimation processing causes redundancy in scanning lines and decoding processing. It further causes change in picture rate that depends on the amount of generated codes. Particularly, a picture rate tends to be lowered for moving picture of a big movement on screen by decimation in progress scanning, thus un-smoothness in reproduced picture being noticeable.

Moving picture is composed of interlaced or progressive moving pictures, as discussed above. An interlaced moving picture has been decimated half the scanning lines, however, has resolution about 70% of that in progressive scanning on stationary scenes. The progressive scanning produces almost no line flicker or crawling.

TV broadcast usually employs interlaced scanning, however, digital TV broadcast employs both interlaced and progressive scanning. Cinema films and animation carry progress moving pictures of about 24 frames per second as an interlaced scanning signal. Such an interlaced scanning signal carries 60 fields per second with the same picture for two or three successive fields.

Encoding of moving pictures by MPEG inter-picture predictive coding requires the same bit rate for both interlaced and progressive scanning when the picture rate and the number of scanning lines is the same. Progressive scanning is, however, superior to interlaced scanning on coding efficiency because the former carries scanning lines twice the latter.

A picture rate converted to half in progressive scanning lowers frame correlation, thus a required bit rate being lowered to 60 to 80% of the original rate. The bit rate in progressive scanning is lowered drastically compared to that in encoding in interlaced scanning at the same number of scanning lines. A picture rate is, however, half in progressive scanning, thus loosing smoothness in motion on screen a little bit when reproduced.

A well-known scanning line conversion performs conversion of interlaced pictures into progressive pictures at the same picture rate. Progressive pictures converted to half the picture rate lowers a coding bit rate compared to interlaced pictures having the same number of scanning lines, however, being reproduced rough on screen for rapidly moving pictures.

SUMMARY OF THE INVENTION

In view of the foregoing, a purpose of the present invention is to provide a variable picture rate coding apparatus and method for effectively changing a picture rate with adequate reduction of amount of generated codes and also an apparatus and a method of decoding bitstreams coded by the variable picture rate coding apparatus and method, respectively.

Another purpose of the present invention is to provide a moving-picture coding apparatus and method and a moving-picture decoding apparatus and method for achieving variable picture rate without no decrease in resolution and time reversal.

Still, another purpose of the present invention is to provide a moving-picture scanning-type conversion apparatus and method for effectively changing a scanning-type of a moving-picture signal.

Still, furthermore, another purpose of the present invention is to provide an apparatus and method for coding a moving-picture signal for which a scanning type is converted by the moving-picture scanning-type conversion apparatus and method, respectively.

The present invention provides a coding apparatus for coding first pictures, that are set at a predetermined interval, to be used as reference pictures for inter-picture prediction of an incoming moving picture and coding second pictures different from the first pictures, the coding apparatus having a variable picture rate coding apparatus including: a first encoder to encode the first pictures by intra-picture coding or unidirectional inter-picture predictive coding, thus obtaining a first bitstream; a picture rate setter to set a coding picture rate in accordance with motion activity of the incoming moving picture; a second encoder to encode pictures that have remained after decimation of the second pictures in accordance with the picture rate by bidirectional inter-picture predictive coding using the first pictures or locally-decoded pictures of the first pictures as the reference pictures, thus obtaining a second bitstream; and a multiplexer to multiplexes the first and the second bitstreams and data indicating the picture rate.

Moreover, the present invention provides a coding apparatus for coding first pictures, that are set at a predetermined interval, to be used as reference pictures for inter-picture prediction of an incoming moving picture and coding second pictures different from the first pictures, the coding apparatus having a variable picture rate coding apparatus including: a first encoder to encode the first pictures by intra-picture coding or unidirectional inter-picture predictive coding, thus obtaining a first bitstream; a picture rate setter to set a coding picture rate in accordance with motion activity of the incoming moving picture; a second encoder to encode the second pictures by bidirectional inter-picture predictive coding using the first pictures or locally-decoded pictures of the first pictures as the reference pictures, to obtain a second bitstream, the second bitstream being decimated in accordance with the picture rate, thus obtaining a third bitstream and a multiplexer to multiplexes the first and the third bitstreams and data indicating the picture rate.

Furthermore, the present invention provides a decoding apparatus for decoding a multiplexed bitstream to which a first bitstream of coded first pictures that are set at a predetermined interval, to be used as reference pictures for inter-picture prediction of a moving picture to be coded, a second bitstream of coded second pictures different from the first pictures, coded by inter-picture prediction and decimated in accordance with a coding picture rate and data indicating the picture rate have been multiplexed, the decoding apparatus having a variable picture rate decoding apparatus including: a decoder to decode the multiplexed bitstream, thus reproducing moving picture; an interpolation rate setter to extract the picture rate data from the multiplexed bitstream for judging a degree of the decimation of the second pictures, thus setting an interpolation rate; and a reproducer to interpolate the reproduced moving picture in accordance with the interpolation rate, thus outputting a moving picture at an adjusted rate.

Moreover, the present invention provides a variable picture rate coding method in a coding method of coding first pictures, that are set at a predetermined interval, to be used as reference pictures for inter-picture prediction of an incoming moving picture and coding second pictures different from the first pictures. The first pictures are coded by intra-picture coding or unidirectional inter-picture predictive coding, thus obtaining a first bitstream. A coding picture rate is set in accordance with motion activity of the incoming moving picture. Pictures that have remained after decimation of the second pictures are coded in accordance with the picture rate by bidirectional inter-picture predictive coding using the first pictures or locally-decoded pictures of the first pictures as the reference pictures, thus obtaining a second bitstream. And, the first and the second bitstreams and data indicating the picture rate are multiplexed.

Furthermore, the present invention provides a coding method of coding first pictures, that are set at a predetermined interval, to be used as reference pictures for inter-picture prediction of an incoming moving picture and coding second pictures different from the first pictures. The first pictures are coded by intra-picture coding or unidirectional inter-picture predictive coding, thus obtaining a first bitstream. A coding picture rate is set in accordance with motion activity of the incoming moving picture. The second pictures are coded by bidirectional inter-picture predictive coding using the first pictures or locally-decoded pictures of the first pictures as the reference pictures, to obtain a second bitstream, the second bitstream being decimated in accordance with the picture rate, thus obtaining a third bitstream. And, the first and the third bitstreams and data indicating the picture rate are multiplexed.

Moreover, the present invention provides a decoding method of decoding a multiplexed bitstream to which a first bitstream of coded first pictures that are set at a predetermined interval, to be used as reference pictures for inter-picture prediction of a moving picture to be coded, a second bitstream of coded second pictures different from the first pictures, coded by inter-picture prediction and decimated in accordance with a coding picture rate and data indicating the picture rate have been multiplexed. The multiplexed bitstream is decoded, thus reproducing moving picture. The picture rate data is extracted from the multiplexed bitstream for judging a degree of the decimation of the second pictures, thus setting an interpolation rate. And, the reproduced moving-picture is interpolated in accordance with the interpolation rate, thus outputting a moving picture at an adjusted rate.

Furthermore, the present invention provides a variable picture rate coding apparatus including: a picture rate setter to set a coding picture rate for each picture portion of a progressive moving picture incoming at a given picture rate, in accordance with motion activity of the incoming progressive moving picture or a coding parameter for coding the incoming moving picture; a generator to decimate scanning lines of the incoming moving picture when the set picture rate and the given picture rate are equal to each other, thus generating an interlaced moving picture whereas decimate frames of the incoming moving picture in accordance with the set picture rate when the set picture rate is lower than the given picture rate, thus generating a progressive moving picture; an encoder to encode the interlace moving picture by interlace coding when the set picture rate and the given picture rate are equal to each other whereas encode the progressive moving picture by progressive scanning when the set picture rate is lower than the given picture rate, thus obtaining a moving-picture bitstream; and a multiplexer to multiplex data indicating the set picture rate and the moving-picture bitstream.

Furthermore, the present invention provides a decoding apparatus for reproducing a progressive moving picture at a desired picture rate from a moving-picture bitstream, the decoding apparatus having a variable picture rate decoding apparatus including: a picture rate setter to obtain date indicating coding picture rate from the moving-picture bitstream, thus setting a decoding picture rate for each picture portion of the moving-picture bitstream; a decoder to decode the moving-picture bitstream under interlaced scanning when the set picture rate and the desired picture rate are equal to each other, thus obtaining a first decoded moving picture whereas decode the moving-picture bitstream under progressive scanning when the set picture rate is lower than the desired picture rate, thus obtaining a second decoded moving picture; and an interpolator to interpolate scanning lines to the first decoded moving picture when the set picture rate and the desired picture rate are equal to each other whereas interpolate frames to the second decoded moving picture when the set picture rate is lower than the desired picture rate, thus reproducing a progressive moving picture at the desired picture rate.

Moreover, the present invention provides a variable picture rate coding apparatus including: a picture rate setter to set a coding picture rate for each picture portion of an interlaced moving picture incoming at a given picture rate in accordance with motion activity of the incoming interlaced moving picture or a coding parameter for coding the incoming moving picture; a scanning-type converter to convert the incoming interlaced moving picture to a progressive moving picture; a picture decimator to decimate frames of the progressive moving picture in accordance with the set picture rate when the set picture rate is lower than the given picture rate, thus obtaining a decimated moving picture; an encoder to encode the incoming interlaced moving picture under interlaced scanning when the set picture rate is equal to the given picture rate whereas encode the decimated moving picture when the set picture rate is lower than the given picture rate, thus obtaining a moving-picture bitstream; and a multiplexer to multiplex data indicating the set picture rate and the moving-picture bitstream.

Furthermore, the present invention provides a decoding apparatus for reproducing an interlaced moving picture at a desired picture rate from a moving-picture bitstream, the decoding apparatus having a variable picture rate decoding apparatus including: a picture rate setter to obtain date indicating coding picture rate from the moving-picture bitstream, thus setting a decoding picture rate for each picture portion of the moving-picture bitstream; a decoder to decode the moving-picture bitstream under interlaced scanning when the set picture rate and the desired picture rate are equal to each other, thus obtaining a first decoded moving picture whereas decode the moving-picture bitstream under progressive scanning when the set picture rate is lower than the desired picture rate, thus obtaining a second decoded moving picture; and output means for outputting the first decoded moving picture when the set picture rate and the desired picture rate are equal to each other whereas obtain a plurality of fields of an interlaced moving picture from the second decoded moving picture when the set picture rate is lower than the desired picture rate, to output the interlaced moving-picture at the desired picture rate.

Moreover, the present invention provides a variable rate picture coding apparatus including: a detector to detect motion activity of a moving picture incoming at a given picture rate; a picture rate setter to set a coding picture rate that is high for a detected large motion activity of the incoming moving picture whereas low for a detected low motion activity of the incoming moving picture; a generator to decimate pictures from the incoming moving picture in accordance with the set picture rate when the set picture rate is lower than the given picture rate, thus obtaining a moving picture at a variable picture rate; an encoder to encode the moving picture at the variable picture rate, thus obtaining a moving-picture bitstream; and a multiplexer to multiplex data indicating the set picture rate and the moving-picture bitstream.

Furthermore, the present invention provides a variable picture rate coding method. A coding picture rate is set for each picture portion of a progressive moving picture incoming at a given picture rate in accordance with motion activity of the incoming progressive moving picture or a coding parameter for coding the incoming moving picture. Scanning lines of the incoming moving picture are decimated when the set picture rate and the given picture rate are equal to each other, thus generating an interlaced moving picture whereas frames of the incoming moving picture are decimated in accordance with the set picture rate when the set picture rate is lower than the given picture rate, thus generating a progressive moving picture. The interlaced moving picture is coded by interlaced coding when the set picture rate and the given picture rate are equal to each other whereas the progressive moving picture is coded by progressive coding when the set picture rate is lower than the given picture rate, thus obtaining a moving-picture bitstream. And, data indicating the set picture rate and the moving-picture bitstream are multiplexed.

Furthermore, the present invention provides a variable picture rate decoding method in a decoding method of reproducing a progressive moving picture at a desired picture rate from a moving-picture bitstream. Data indicating a coding picture rate is obtained from the moving-picture bitstream, thus setting a decoding picture rate for each picture portion of the moving-picture bitstream. The moving-picture bitstream is decoded under interlaced scanning when the set picture rate and the desired picture rate are equal to each other, thus obtaining a first decoded moving picture whereas the moving-picture bitstream is decoded under progressive scanning when the set picture rate is lower than the desired picture rate, thus obtaining a second decoded moving picture. And, scanning lines are interpolated to the first decoded moving picture when the set picture rate and the desired picture rate are equal to each other whereas frames are interpolated to the second decoded moving picture when the set picture rate is lower than the desired picture rate, thus reproducing a progressive moving picture at the desired picture rate.

Moreover, the present invention provides a variable picture rate coding method. A coding picture rate is set for each picture portion of an interlaced moving picture incoming at a given picture rate in accordance with motion activity of the incoming interlaced moving picture or a coding parameter for coding the incoming moving picture. The incoming interlaced moving picture is converted into a progressive moving picture. Frames of the progressive moving picture are decimated in accordance with the set picture rate when the set picture rate is lower than the given picture rate, thus obtaining a decimated moving picture. The incoming interlaced moving picture is coded under interlaced scanning when the set picture rate is equal to the given picture rate whereas the decimated moving picture is coded when the set picture rate is lower than the given picture rate, thus obtaining a moving-picture bitstream. And, the set picture rate and the moving-picture bitstream are multiplexed.

Furthermore, the present invention provides a variable picture rate decoding method in a decoding method of reproducing an interlaced moving picture at a desired picture rate from a moving-picture bitstream. Data indicating a coding picture rate is obtained from the moving-picture bitstream, thus setting a decoding picture rate for each picture portion of the moving-picture bitstream. The moving-picture bitstream is decoded under interlaced scanning when the set picture rate and the desired picture rate are equal to each other, thus obtaining a first decoded moving picture whereas the moving-picture bitstream is decoded under progressive scanning when the set picture rate is lower than the desired picture rate, thus obtaining a second decoded moving picture. And, the first decoded moving picture is output when the set picture rate and the desired picture rate are equal to each other whereas a plurality of fields of an interlaced moving picture are obtained from the second decoded moving picture when the set picture rate is lower than the desired picture rate, to output the interlaced moving-picture at the desired picture rate.

Moreover, the present invention provides a variable picture rate coding method. Motion activity of a moving picture incoming at a given picture rate is detected. A coding picture rate is set that is high for a detected large motion activity of the incoming moving picture whereas low for a detected low motion activity of the incoming moving picture. Pictures are decimated from the incoming moving picture in accordance with the set picture rate when the set picture rate is lower than the given picture rate, thus obtaining a moving picture at a variable picture. The moving picture at the variable picture rate is coded, thus obtaining a moving-picture bitstream. And, data indicating the set picture rate and the moving-picture bitstream are multiplexed.

Furthermore, the present invention provides a moving-picture scanning-type conversion apparatus including: a scanning-type setter to set a scanning type for each picture portion of an interlaced moving picture incoming at a given picture rate, in accordance with motion activity of the incoming moving picture; a converter to convert the incoming interlaced moving picture into a progressive moving picture at a picture rate that is half the given picture rate; and a switch to switch the incoming interlaced moving picture and the progressive moving picture for each picture portion in accordance with the set scanning type.

Moreover, the present invention provides a moving-picture scanning-type conversion apparatus including: a scanning-type setter to set a scanning type for each picture portion of a progressive moving picture incoming at a given picture rate, in accordance with motion activity of the incoming moving picture; a scanning line decimator to decimate scanning lines from the incoming progressive moving picture, thus obtaining an interlaced moving picture at the give picture rate; a frame decimator to decimate frames from the incoming progressive moving picture, thus obtaining a progressive moving picture at a picture rate that is half the given picture rate; and a switch to switch the obtained interlaced moving picture and the obtained progressive moving picture in accordance with the set scanning type.

Moreover, the present invention provides a moving-picture coding apparatus for coding a moving picture incoming at a given picture rate including: a scanning-type setter to set a coding scanning type for the incoming moving picture in accordance with motion activity of the incoming moving picture; an encoder to apply a first coding processing to the incoming moving picture when the set coding scanning type is interlaced scanning, the first coding processing being applied to interlaced moving picture at the given picture rate whereas apply a second coding processing to the incoming moving picture when the set coding scanning type is progressive scanning, the second coding processing being applied to progressive moving picture at a picture rate half the given picture rate, thus obtaining a moving-picture bitstream; and a multiplexer to multiplex data indicating the set coding scanning type and the moving-picture bitstream.

Furthermore, the present invention provides a moving-picture scanning-type conversion apparatus including: a scanning line interpolator to generate scanning lines from an incoming first interlaced moving picture, the scanning lines corresponding to scanning lines that have been decimated due to interlaced scanning, thus obtaining a second interlaced moving picture that is delayed by one field to the first interlaced moving picture; and a generator to output the first and the second interlaced moving pictures alternately for each field, thus obtaining a progressive moving picture at a picture rate half a picture rate of the first interlaced moving picture.

Furthermore, the present invention provides a moving-picture scanning-type conversion method. A scanning type is set for each picture portion of an interlaced moving picture incoming at a given picture rate, in accordance with motion activity of the incoming moving picture. The incoming interlaced moving picture is converted into a progressive moving picture at a picture rate that is half the given picture rate. And, the incoming interlaced moving picture and the progressive moving picture are switched for each picture portion in accordance with the set scanning type.

Moreover, the present invention provides a moving-picture scanning-type conversion method. A scanning type is set for each picture portion of a progressive moving picture incoming at a given picture rate, in accordance with motion activity of the incoming moving picture. Scanning lines are decimated from the incoming progressive moving picture, thus obtaining an interlaced moving picture at the given picture rate. Frames are decimated from the incoming progressive moving picture, thus obtaining a progressive moving picture at a picture rate that is half the given picture rate. And, the obtained interlaced moving picture and the obtained progressive moving picture are switched in accordance with the set scanning type.

Moreover, the present invention provides a moving-picture coding method for coding a moving picture incoming at a given picture rate. A coding scanning type is set for the incoming moving picture in accordance with motion activity of the incoming moving picture. A first coding processing is applied to the incoming moving picture when the set coding scanning type is interlaced scanning, the first coding processing being applied to interlaced moving picture at the given picture rate whereas a second coding processing is applied to the incoming moving picture when the set coding scanning type is progressive scanning, the second coding processing being applied to progressive moving picture at a picture rate half the given picture rate, thus obtaining a moving-picture bitstream. And, data indicating the set coding scanning type and the moving-picture bitstream are multiplexed.

Furthermore, the present invention provides a moving-picture scanning-type conversion method. Scanning lines are generated from an incoming first interlaced moving picture, the scanning lines corresponding to scanning lines that have been decimated due to interlaced scanning, thus obtaining a second interlaced moving picture that is delayed by one field to the first interlaced moving picture. And, the first and the second interlaced moving pictures are output alternately for each field, thus obtaining a progressive moving picture at a picture rate half a picture rate of the first interlaced moving picture.

DETAILED DESCRIPTION OF PREFERRED EMBODIMENTS

Figure 1:
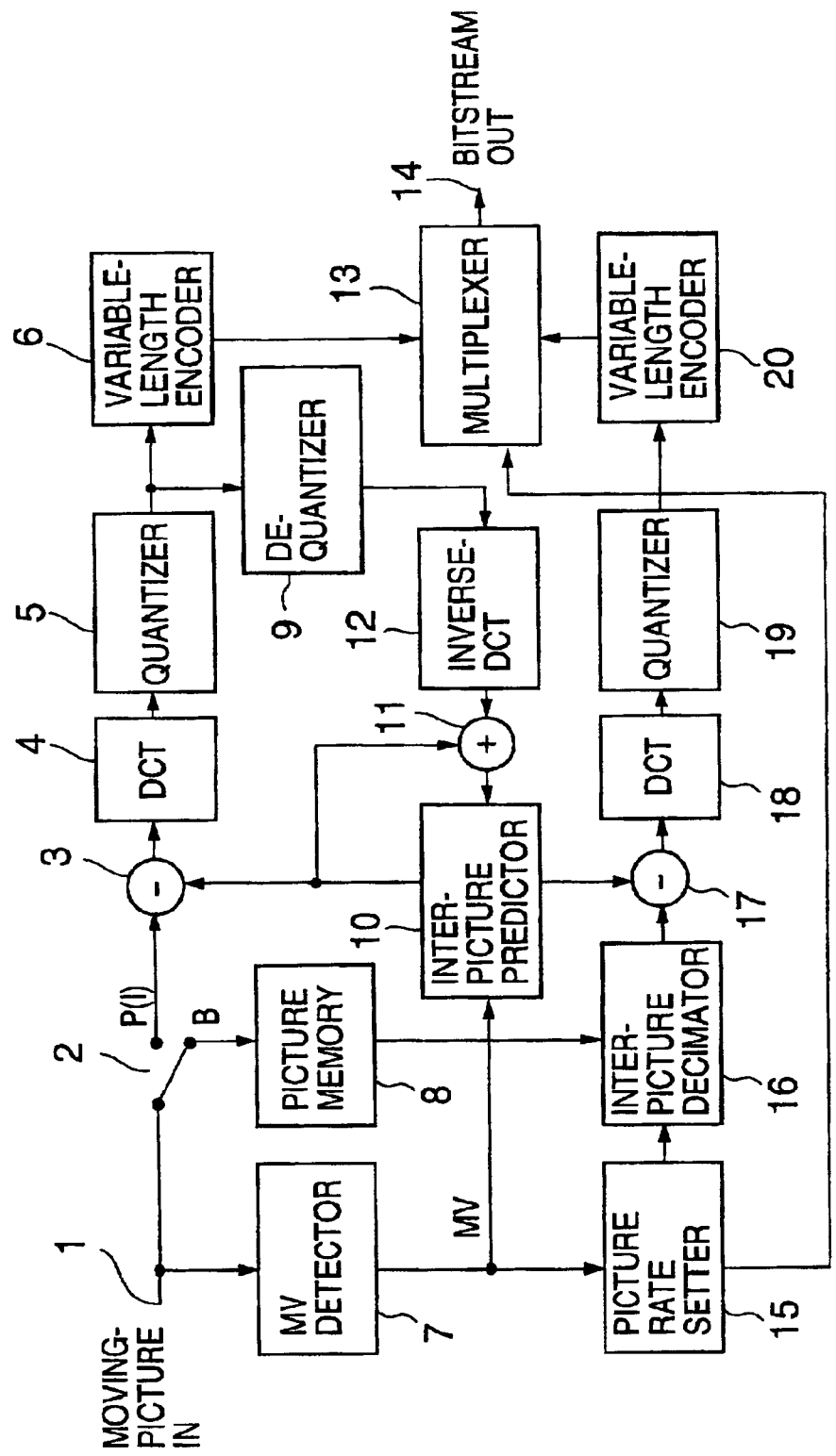
FIG. 1 is a block diagram of the first preferred embodiment of a variable picture rate coding apparatus according to the present invention.

A concept of the present invention is that, in variable picture rate coding, pictures, such as, B-pictures that will not be used as reference pictures for inter-picture prediction in MPEG, only are decimated, thus P-pictures to be used as reference pictures remaining unchanged.

Inter-picture prediction for the remaining B-pictures after decimation is therefore the same for B-pictures before decimation. In other words, the present invention performs decimation of pictures with the same inter-picture prediction processing for pictures both before and after decimation.

Decimation of B-pictures is performed in several steps for several pictures to adjust a picture rate while maintaining uniformity on time, thus the present invention offering a picture rate adequate for human visual performance on movement.

Moreover, in variable picture rate decoding, a degree of decimation is determined according to an input bitstream and compensated for to meet an output rate, thus the present invention achieving reproduction of smooth moving picture.

Another concept of the present invention is that a coding picture rate is set per portion of a picture according to motion activity of incoming moving picture at a given picture rate or a coding parameter for coding the incoming moving picture, to perform coding under interlaced scanning when the set coding picture rate is equal to the given picture rate whereas perform coding under progressive scanning when the set coding picture rate is lower than the given picture rate.

The picture portions coded under interlaced scanning are reproduced as they are under interlaced scanning while reproduced by interpolating scanning lines under progressive scanning, thus obtaining moving picture of high quality.

On the other hand, the picture portions coded under progressive scanning at a lowered picture rate are reproduced by generating successive frames of the same picture to an adequate picture rate under progressive scanning while reproduced by separating a progressive frame into an even field and an odd field and repeatedly generating them under interlaced scanning, thus obtaining smooth moving picture.

Moving picture is coded under interlaced scanning at the given picture rate while coded under progressive scanning at a lowered picture rate, thus few amount of picture data being coded for high coding efficiency.

Still another concept of the present invention is that a scanning type, such as, interlaced scanning or progressive scanning, is set according to motion activity of an incoming moving picture to convert a scanning type of the incoming moving picture to the set scanning type, for outputting the moving picture with switching interlaced pictures and progressive pictures of a picture rate half the interlaced pictures, and the coding the moving picture under the set scanning type.

The number of scanning lines is the same for both interlaced pictures and progressive pictures of a picture rate half the interlaced pictures, thus both pictures can be processed in the same way. Rapidly moving pictures are coded under interlaced scanning (interlaced coding) with at a picture rate unchanged. On the other hand, slowly moving pictures are coded under progressive scanning (progressive coding) at a picture rate lowered to half with drastic deduction of bit rate compared to interlaced coding. Progressive coding lowers a picture rate to half, however, pictures to be subjected to progressive coding are slowly moving pictures, thus posing no difficulty in viewing.

Preferred embodiments according to the present invention will now be disclosed with reference to the attached drawings.

(First Embodiment of Variable Picture Rate Coding Apparatus)

FIG. 1 is a block diagram of the first preferred embodiment of a variable picture rate coding apparatus according to the present invention.

An incoming moving-picture video signal is supplied to a switch 2 and a motion vector (MV) detector 7 through an input terminal 1. The input video signal carries 480 p (p: progressive)-moving pictures of 720×480 pixels and 60 fps (frame per second).

The switch 2 supplies one I- or P-picture to a subtracter 3 for every sixth frame and the remaining B-pictures to a picture memory 8.

A predictive signal supplied by an interframe predictor 10 is subtracted from each P-picture video signal by the subtracter 3 for generation of a predictive error signal. The predictive error signal is supplied to a discrete cosine transformer (DCT) 4.

The predictive error signal is transformed into DCT coefficients by DCT-processing and supplied to a quantizer 5. The DCT coefficients are quantized at a predetermined quantization step width to become fixed-length codes and supplied to a variable-length encoder 6. The fixed-length DCT coefficients (predictive error signal) are compressed by using variable-length codes and supplied to a multiplexer 13.

The fixed-length DCT coefficients for P-pictures are further supplied to a de-quantizer 9 and then an inverse-DCT 12. The de-quantizer 9 and the inverse-DCT 12 perform processing that is reverse of processing performed by the DCT 4 and quantizer 5, to reproduce the predictive error signal.

The reproduced predictive error signal is supplied to an adder 11 and added to a predictive signal, to reproduce a moving-picture signal. The reproduced moving-picture signal is supplied to the interframe predictor 10.

The interframe predictor 10 stores the reproduced moving-picture signal for P-pictures as a reference picture signal and performs motion compensation in accordance with a motion vector (MV) detected by the MV detector 7, to generate a predictive signal which is then supplied to the subtracter 3 and adder 11.

The MV detector 7 detects a spatial movement amount of a reference frame with respect to a frame to be coded for every (16×16) blocks. The detected spatial movement amount is supplied as a motion vector (MV) to the interframe predictor 10 and a picture rate setter 15.

The B-picture moving-picture video signal has been stored in the picture memory 8 until completion of coding of the preceding P(I)-pictures. In this embodiment, 5-frame B-picture moving-picture video signal has been stored for 6-frame period because P(I)-pictures have been supplied for every 6th-frame.

The stored B-picture moving-picture video signal is supplied to a picture decimator 16 and subjected to decimation at a predetermined picture rate, the resultant signal being supplied to a subtracter 17 and then to a DCT 18, a quantizer 19 and a variable-length encoder 20.

The subtracter 17, the DCT 18, the quantizer 19 and the variable-length encoder 20 perform the same processing as the subtracter 3, the DCT 4, the quantizer 5 and the variable-length encoder 6, the difference being quantizing parameters only.

A bitstream generated by the variable-length encoder 20 and also a picture rate set by the picture rate setter 15 is multiplexed by the multiplexer 13 with a P(I)-picture bitstream generated by the variable-length encoder 6, and output through an output terminal 14. Multiplexed as picture rate data may be a picture rate value data or picture number data for which a picture number of each picture is decimated.

A picture rate is set at the picture rate setter 15 for each segment between a P-picture and the next P-picture for 0.1 seconds based on an incoming MV to be used for P-picture prediction.

The following are four types of picture rate and the corresponding decimation patterns for decimating only B-pictures for reproducing uniform pictures after decimation, a picture being expressed in unit of fps:

60 fps: no B-pictures decimated, or all pictures remain for each segment;

30 fps: three B-pictures decimated, or two B-pictures remain for each segment;

20 fps: four B-pictures decimated, or one B-picture remains for each segment; and 10 fps: all B-pictures decimated, or no B-pictures remain for each segment.

Figure 2:
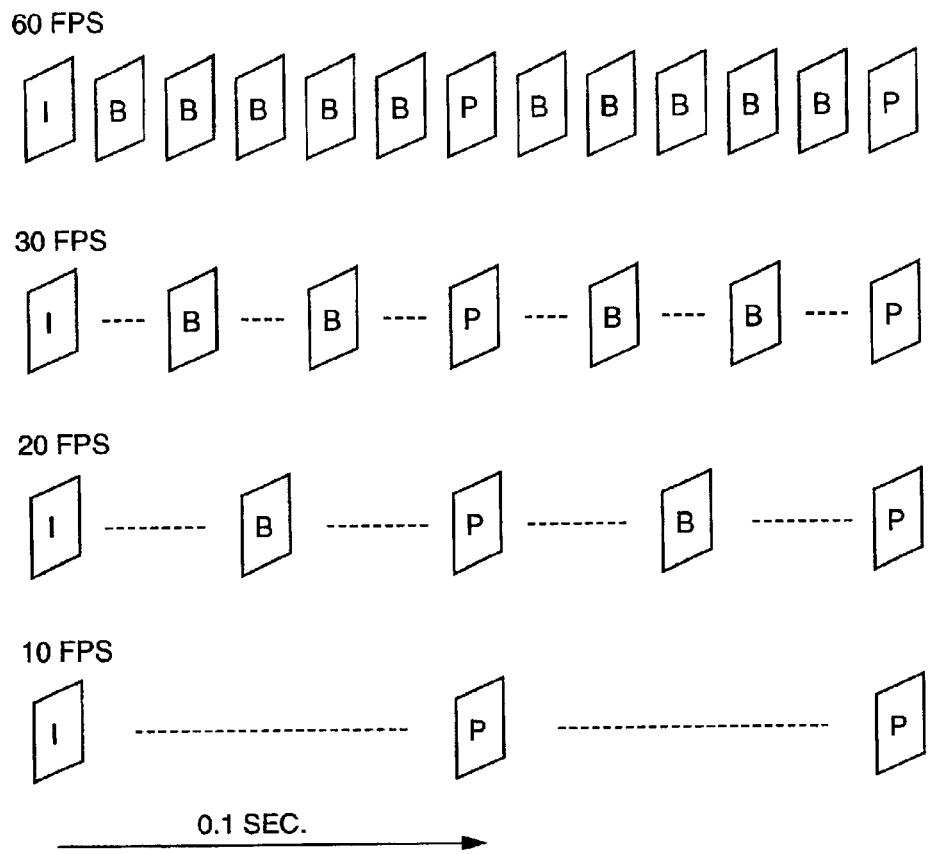
FIG. 2 illustrates B-picture decimation according to the first embodiment shown in FIG. 1.

FIG. 2 illustrates which B-pictures are decimated according to the picture rate. B-pictures to be decimated are decided so that the remaining B-pictures and the preceding and the following P(I)-pictures after decimation are arranged at a constant interval.

Discussed next is picture (transfer) rate setting.

A moving-picture video signal mostly carries 60 frames (or fields) according to a limit on detection of a flicker on screen, however, such number of frames (or fields) are not always required for every moving picture. For example, cinema films require 24 fps, so that un-smooth movement (jaggy movement, etc.) is noticeable only for rapidly moving scenes at 30 fps, however, not noticeable at 20 fps whereas noticeable at 10 fps except stationary scenes.

Therefore, decimation control, in which a picture rate is switched among 60 fps only for rapid movement, 30 fps for frequent movement, 20 fps for infrequent movement, and 10 fps for almost stationary scenes, offers smooth and natural movement on screen when moving pictures are reproduced.

In detail, a transfer rate is detected by using a horizontal component MVx (i, j) and a vertical component MVy (i, j) of a motion vector used for P-picture coding in which "i" and "j" indicate horizontal and vertical positions, respectively, on one frame when movement of one pixel is 1. 0.

The following are two techniques to obtain a picture (transfer) rate (R).

(1) A transfer rate is obtained by using motion activity MA for the entire frame and a threshold level, the MA being obtained according to the following equation.

$$MA = \left( \sum_{i=0}^{44} \sum_{i=0}^{29} MVx(i,\ j)^2 + MVy(i,\ j)^2 \right) \Big/ 1350 \qquad (1)$$

R=60 fps . . . 64 k<MA
R=30 fps . . . 8 k<MA$\leq$64 k
R=20 fps . . . k<MA$\leq$8 k
R=10 fps . . . MA$\leq$k where k=1 as a standard value, however, can be varied in accordance with a parameter for quantization step width.

Figure 3:
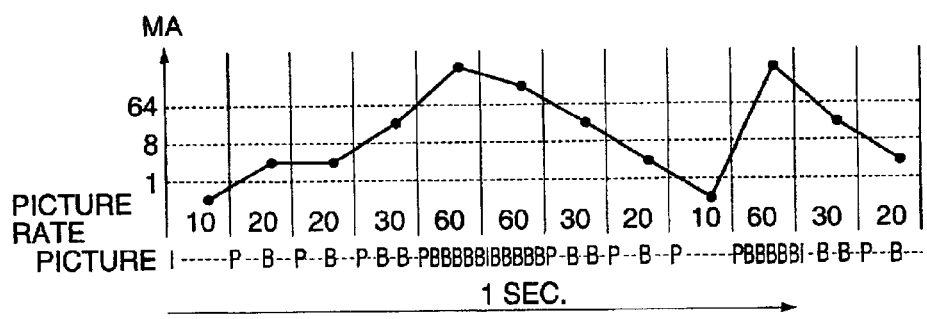
FIG. 3 illustrates change in motion activity and coded pictures according to the first embodiment shown in FIG. 1.

FIG. 3 illustrates change in MA, picture rate and coded pictures in technique (1).

(2) Another technique to obtain a picture (transfer) rate is deciding how many blocks on which pictures portions move rapidly on screen. This is based on the fact that a picture portion that is moving rapidly is very noticeable even though an entire picture is not moving.

The number of blocks on which pictures portions move rapidly is obtained based on distribution of the degree of motion on each block MVD(i, j) as follows:

$$MVD(i,\ j) = |MVx(i,\ j)| + |MVy(i,\ j)| \qquad (2)$$

the number of blocks within a frame for which
MD64=MVD(i, j)$\geq$64
MD32=MVD(i, j)$\geq$32
MD16=MVD(i, j)$\geq$16
MD8=MVD(i, j)$\geq$8
R=60 fps . . . MD64$\geq$8 k or MD32$\geq$32 k
R=30 fps . . . MD32$\geq$8 k or MD16$\geq$32 k, other than the above
R=20 fps . . . MD16$\geq$8 k or MD8$\geq$32 k, other than the above
R=10 fps . . . other than the above
where a basic picture rate is 60 fps and a P(I)-picture segment (M) is 6.

Decimation at another basic picture rate and a P(I)-picture segment (M), such as, 50 fps and M=4, is as follows:

50 fps: no B-pictures decimated, or all pictures remain for each segment;

25 fps: one B-picture remains for each segment; and 12.5 fps: all B-pictures are decimated for each segment.

How a transfer rate varies according to decimation using the equations above is discussed below.

Discussed first is decimation of B-pictures equaling to decrease in transfer bit rate.

Although depending on moving pictures, a code amount ratio of I- pictures to P-pictures is about 3:1 and that of P-pictures to B-pictures is also about 3:1.

For example, a bitstream at bit rate of 6.0 Mbps before decimation is composed of I-pictures of 700 kbits, P-pictures of 200 kbits and B-pictures of 60 kbits on average.

When the 6.0-Mbps bitstream is decimated at a rate of 30 fps, three B-pictures per segment, or B-pictures of 180 kbits (60 k×3) are decimated for 0.1 seconds, so that the bitstream becomes a 4.2-Mbps bitstream.

When the 6.0-Mbps bitstream is decimated at a rate of 20 fps, four B-pictures per segment, or B-pictures of 240 kbits (60 k×4) are decimated for 0.1 seconds, so that the bitstream becomes a 3.6-Mbps bitstream.

Moreover, when the 6.0-Mbps bitstream is decimated at a rate of 10 fps, five B-pictures per segment, or B-pictures of 300 kbits (60 k×5) are decimated for 0.1 seconds, so that the bitstream becomes a 3.0-Mbps bitstream.

It is apparent that a transfer rate is decreased to about 50% step by step according to the picture rate control. The amount of codes to be removed is, however, restricted in some extent for segments of small motion activity at a low picture rate because such segments have a small amount of B-picture codes.

On the other hand, at a fixed transfer rate, quantization is controlled to have a constant transfer rate, thus achieving fine quantization in accordance with a decreased code amount for improving reproduced picture quality.

(First Embodiment of Variable Picture Rate Decoding Apparatus)

Figure 4:
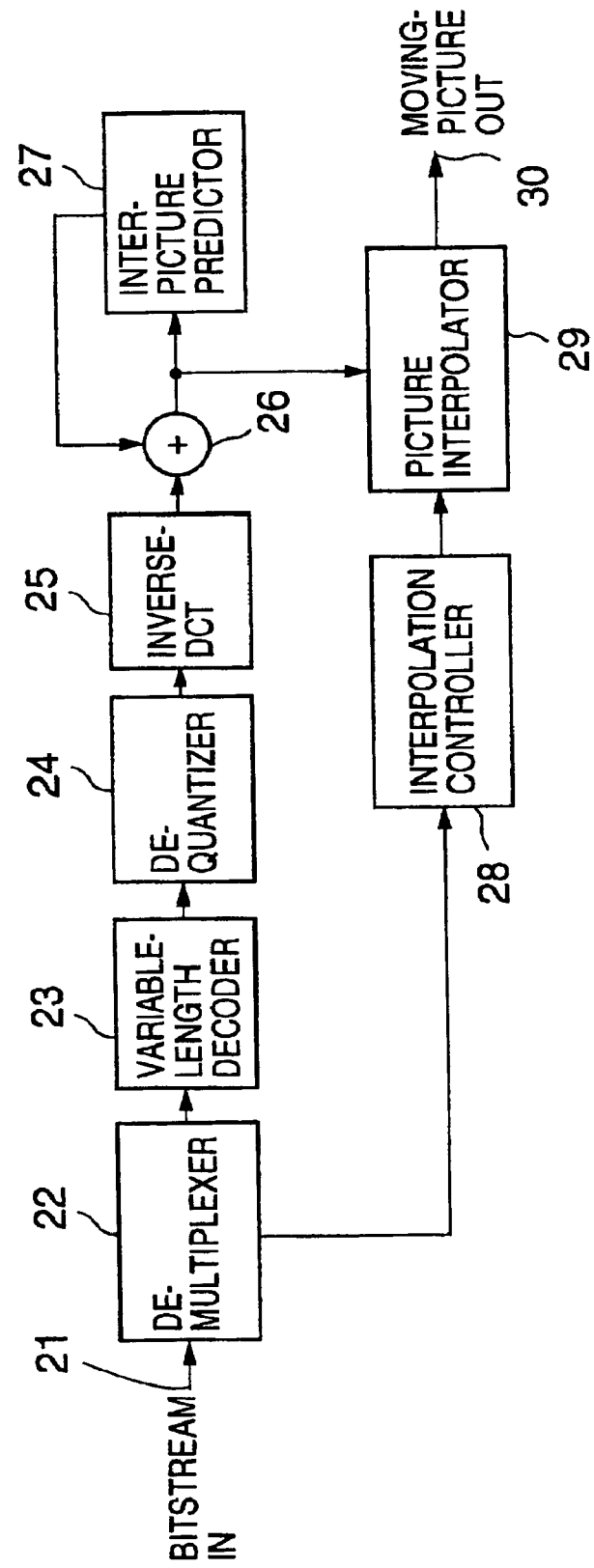
FIG. 4 is a block diagram of the first preferred embodiment of a variable picture rate decoding apparatus according to the present invention.

FIG. 4 is a block diagram of the first preferred embodiment of a variable picture rate decoding apparatus according to the present invention, which is applicable to process a bitstream supplied by the coding apparatus shown in FIG. 1.

A bitstream, for example, supplied by the variable picture rate coding apparatus shown in FIG. 1, is supplied to a de-multiplexer 22, through an input terminal 22, and separated into a moving-picture bitstream and picture rate data that indicates a picture rate value or picture number that has been used in coding.

The moving-picture bitstream and the picture rate data are supplied to a variable-length decoder 23 and an interpolation controller 28, respectively.

The moving-picture bitstream is converted into the original fixed-length codes by the variable-length decoder 23 and supplied to a de-quantizer 24 to be converted into coefficients.

The coefficients are supplied to an in inverse DCT 25 and transformed into a predictive error signal for each (8×8) coefficients.

The reproduced predictive error signal is supplied to an adder 26 and added to a predictive signal to obtain a decoded moving-picture video signal.

The decoded moving-picture video signal is supplied to an inter-picture predictor 27 and a picture interpolator 29.

The inter-picture predictor 27 performs motion-compensation to a pre-stored decoded moving-picture video signal based on a motion vector to produce a predictive signal which is then supplied to the adder 26.

The decoded moving-picture video signal is subjected to frame interpolation by the picture interpolator 29 to become 60 fps-moving-picture video signal which is output through an output terminal 30.

The interpolation controller 28 detects how the decoded moving-picture video signal has been decimated according to difference data on the picture rate value or the picture number, to obtain the number of frames to be interpolated which is supplied to the picture interpolator 29.

Figure 5:
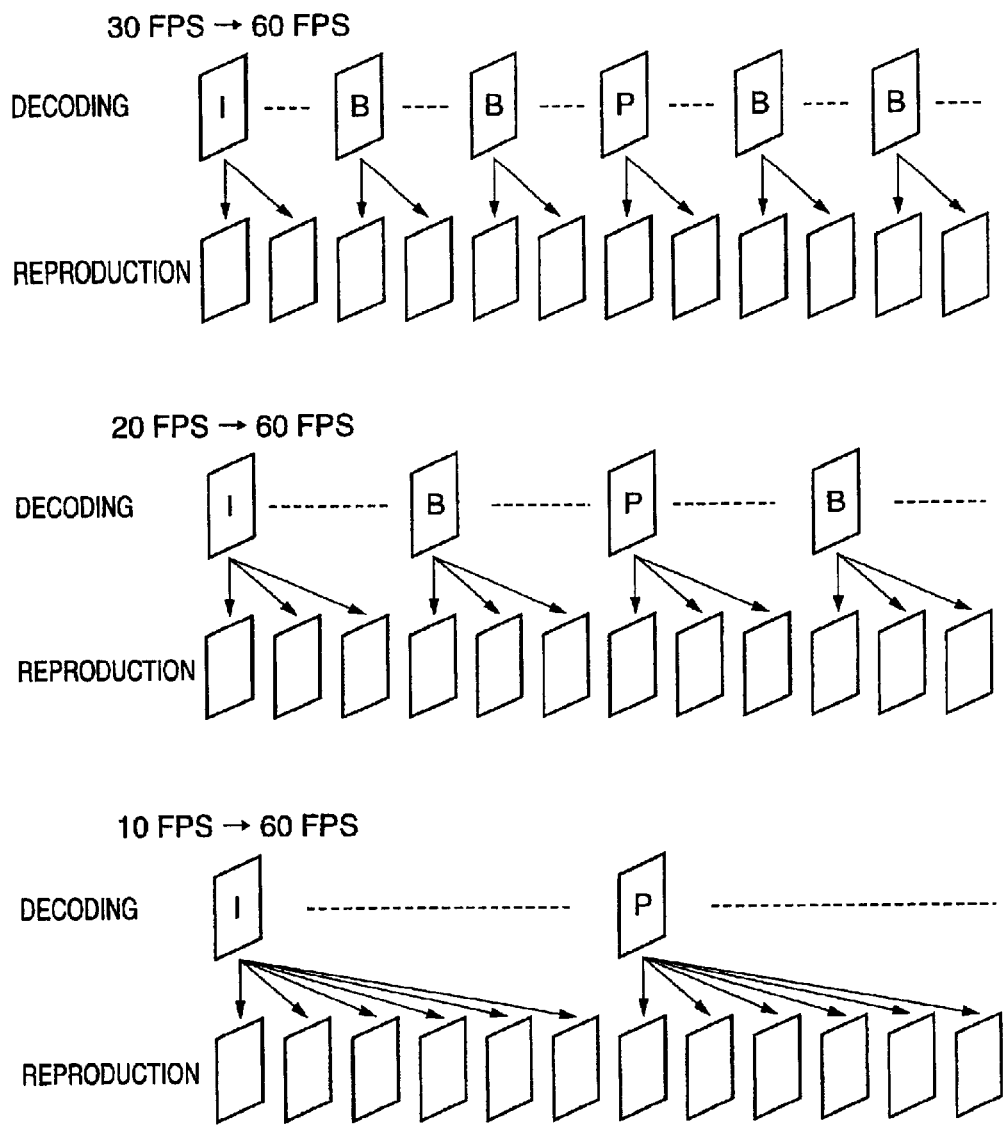
FIG. 5 illustrates picture interpolation according to the first embodiment shown in FIG. 4.

Frame interpolation is illustrated in FIG. 5.

Although not illustrated, no interpolation is performed at 60 fps because no decimation has been performed.

At 30 fps, interpolation is performed to have successive two frames of the same picture of the decoded moving-picture video signal to reproduce moving-picture video signal.

At 20 fps, interpolation is performed to have successive three frames of the same picture of the decoded moving-picture video signal to reproduce moving-picture video signal.

Moreover, at 10 fps, interpolation is performed to have successive six frames of the same picture of the decoded moving-picture video signal to reproduce moving-picture video signal.

(Second Embodiment of Variable Picture Rate Coding Apparatus)

Figure 6:
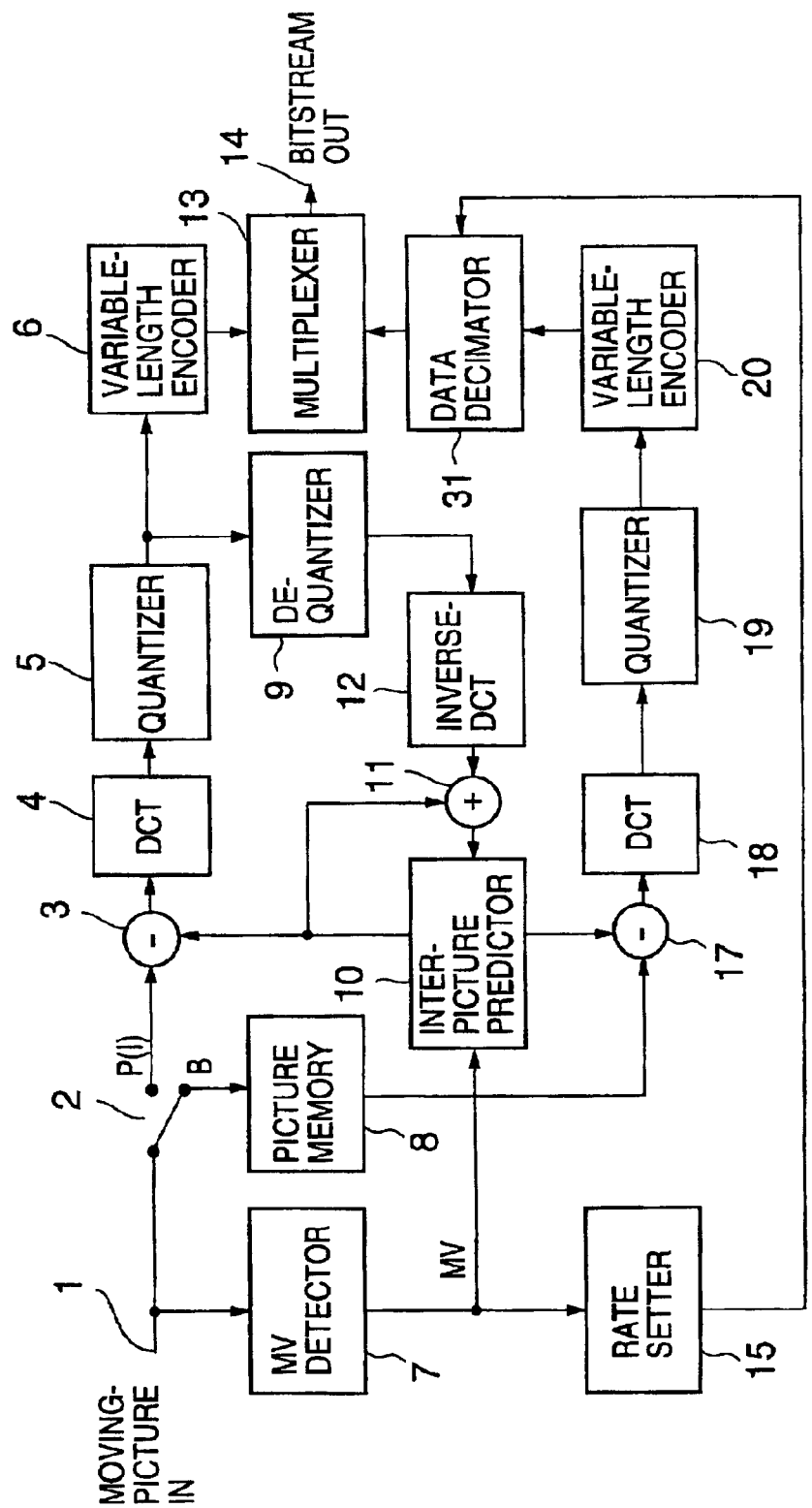
FIG. 6 is a block diagram of the second preferred embodiment of a variable picture rate coding apparatus according to the present invention.

FIG. 6 is a block diagram of the second preferred embodiment of a variable picture rate coding apparatus according to the present invention.

Elements in this embodiment that are the same as or analogous to elements in the first embodiment (FIG. 1) are referenced by the same reference numbers and will not be described in detail.

Instead of the picture decimator 16 (FIG. 1), the second embodiment is provided with a data decimator 31.

The difference between the first and the second embodiments is that, in the former, B-pictures of an incoming moving-picture video signal are decimated and then the remaining pictures are coded whereas, in the latter, all pictures including B-pictures are coded and then the resultant bitstream is subjected to B-picture decimation.

The subtracter 17, the DCT 18, the quantizer 19 and the variable-length encoder 20 have the same function as the counterparts in FIG. 1, however, perform a coding processing to all pictures including B-pictures due to no decimation at this stage.

The coded moving-picture bitstream is supplied to the data decimator 31. The decimator 31 detects a frame period and decimates B-picture data from the coded moving-picture bitstream for each frame according to the picture rate.

The remaining B-picture bitstreams are supplied to the multiplexer 13 and multiplexed with the bitstreams supplied by the variable-length encoder 6 to obtain an output bitstream which is the same as that output by the coding apparatus shown in FIG. 1. Due to data decimation, the output bitstream carries intermittent picture numbers. This is because the picture numbers are not varied before and after decimation.

The variable picture rate coding apparatus of the second embodiment is more applicable than the first embodiment when realized by hardware because the second embodiment performs coding processing in synchronism with frames.

(Third Embodiment of Variable Picture Rate Coding Apparatus)

Figure 7:
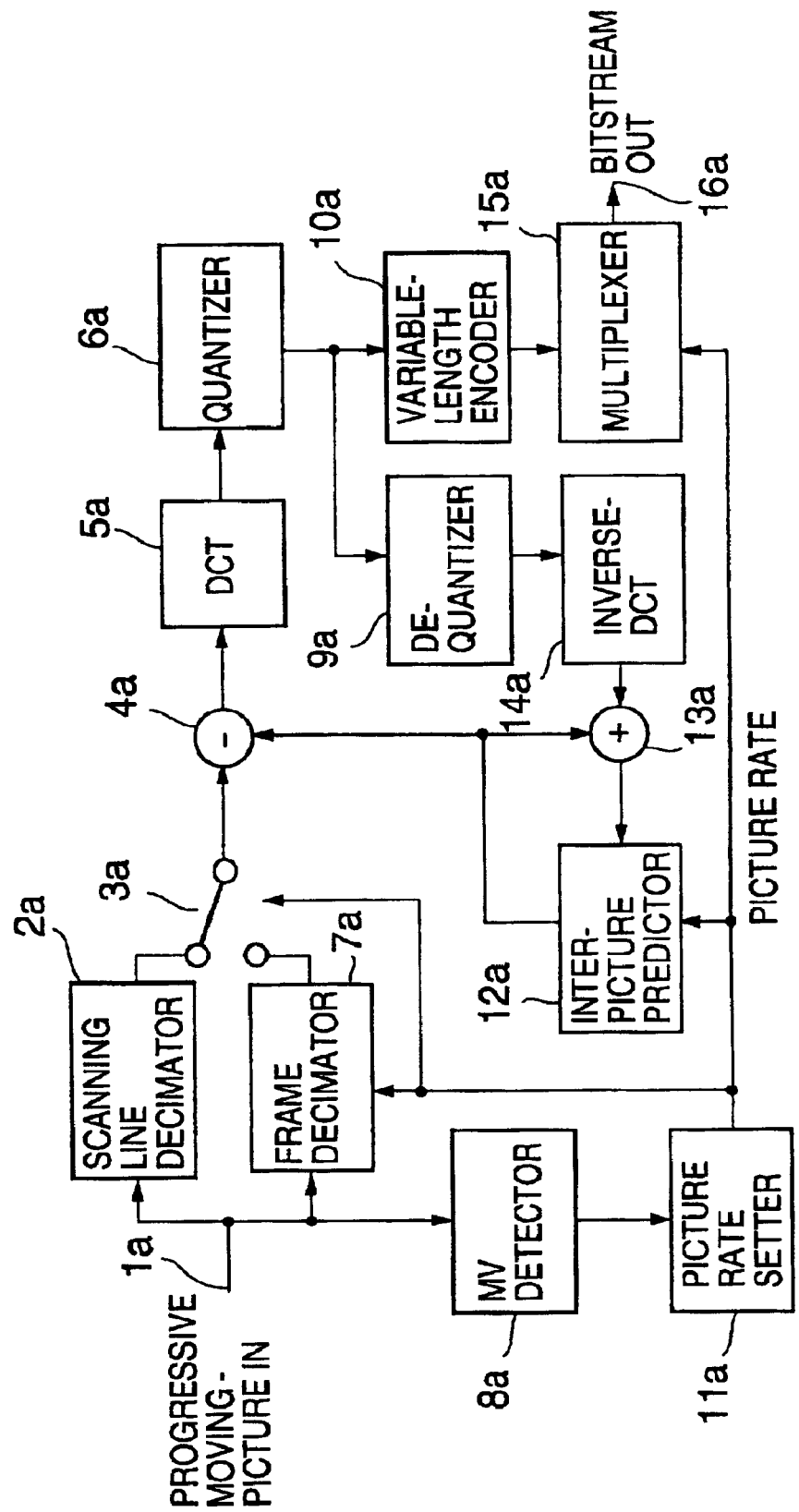
FIG. 7 is a block diagram of the third preferred embodiment of a variable picture rate coding apparatus according to the present invention.

FIG. 7 is a block diagram of the third preferred embodiment of a variable picture rate coding apparatus according to the present invention.

An incoming progressive moving-picture video signal at a picture rate of 60 fps is supplied to a scanning line decimator 2a, a frame decimator 7a and a motion vector (MV) detector 8a through an input terminal 1a.

The scanning line decimator 2a decimates the scanning lines of the incoming progressive video signal for every second scanning line to produce an interlaced moving-picture video signal at the same picture rate of 60 fps. The interlaced video signal is supplied to a switch 3a.

The frame decimator 7a decimates the incoming progressive video signal to lower the picture rate from 60 fps to 30, 20 and 15 fps and supplies the picture rate-lowered progressive video signal to the switch 3a.

The switch 3a selects the 60 fps-interlaced video signal from the scanning line decimator 2a when picture rate data sent from a picture rate setter 11a indicates a picture rate of 60 fps. On the other hand, the switch 3a selects the picture rate-lowered progressive video signal when the picture rate data indicates a picture rate 30 fps or lower.

The selected moving-picture video signal is supplied to a subtracter 4a, from which a predictive signal supplied by an inter-picture predictor 12a is subtracted, to produce a predictive error signal.

The predictive error signal is supplied to a DCT 5a and transformed into DCT coefficients which is supplied to a quantizer 6a.

The quantizer 6a quantizes the DCT coefficients at a predetermined step width to produce fixed-length codes. The fixed-length codes are supplied to a variable-length encoder 10a and a de-quantizer 9a, and further to an inverse-DCT 14a.

The variable-length encoder 10a compresses the fixed-length codes of predictive error signal to produce a bitstream which is supplied to a multiplexer 15a.

The de-quantizer 9a and the inverse-DCT 14a process the fixed-length codes to reproduce the predictive error signal, with a decoding processing which is reverse of the coding processing performed by the DCT 5a and the quantizer 6a.

The reproduced predictive error signal is supplied to an adder 13a, to which a predictive signal is added, to reproduce the moving-picture signal. The moving-picture signal is supplied to an inter-picture predictor 12a.

The inter-picture predictor 12a produces a predictive signal by using a pre-stored moving-picture signal. The predictive signal is supplied to the subtracter 4a and the adder 13.

Being interlocked with the switch 3a, the inter-picture predictor 12a performs inter-picture prediction under interlaced scanning when the picture rate data sent from the picture rate setter 11a indicates 60 fps whereas performs inter-picture prediction under progressive scanning when it indicates 30 fps or lower.

The MV detector 8a detects spatial movement over one frame of the incoming moving-picture video signal for each block of 16×16 pixels and sends it to the picture rate setter 11a as motion vector (MV).

Figure 8:
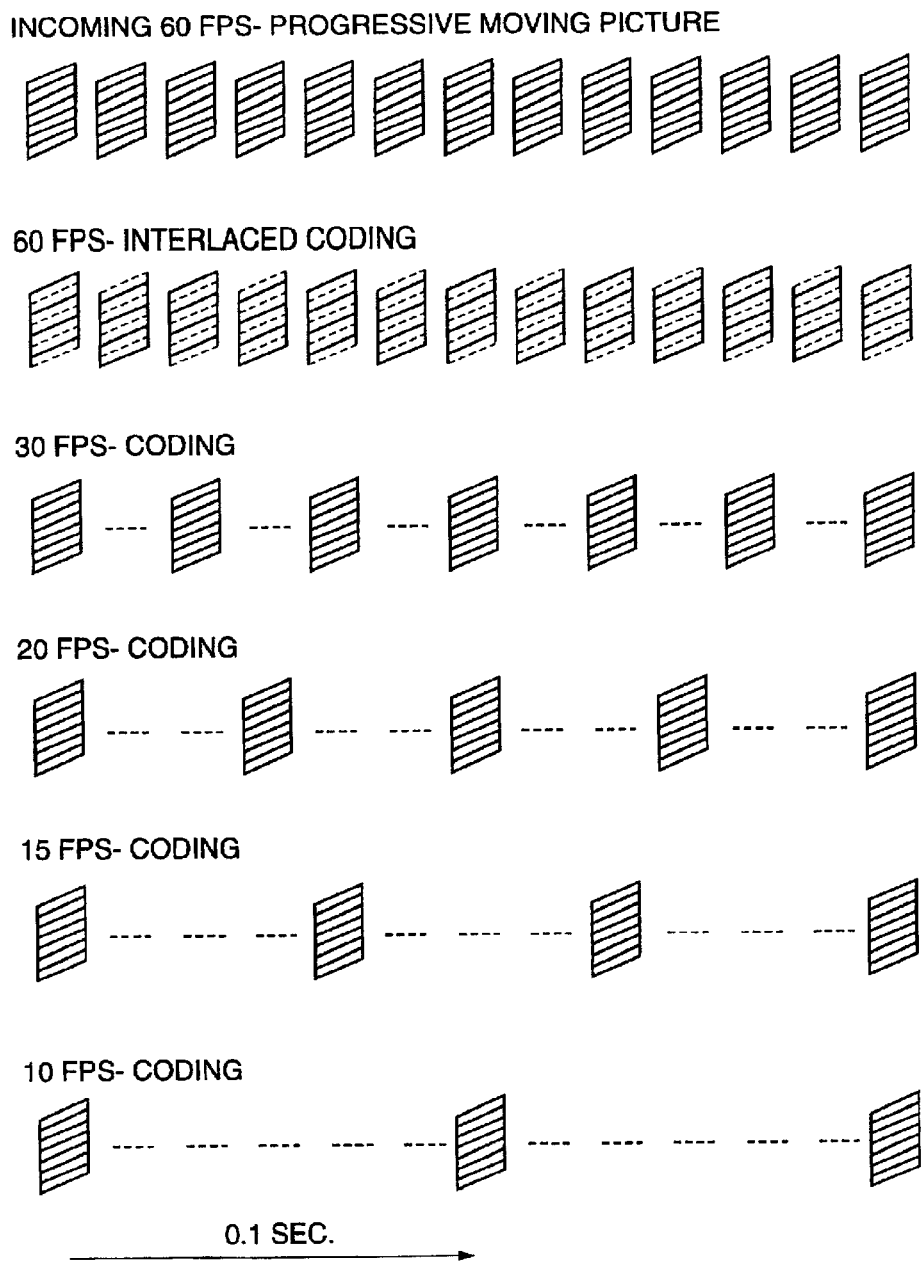
FIG. 8 illustrates decimation of frames and scanning lines.

The picture rate setter 11a selects and sets a picture rate as the picture rate data based on the incoming MV among 60, 30, 20, 15, and 10 fps. FIG. 8 illustrates decimation of frames and scanning lines at picture rate of 60, 30, 20, 15, and 10 fps.

The picture rate data is supplied to the frame decimator 7a, the switch 3a, the inter-picture predictor 12a and also the multiplexer 15a. The picture rate data is multiplexed with the moving-picture bitstream sent from the variable-length encoder 10a and output through an output terminal 16a. The picture rate data may indicates a picture rate value or a frame (filed) number decimated according to the picture rate.

Picture rate setting performed by the picture rate setter 11a is discussed.

A picture rate may be set according to virtual buffer occupancy by detecting generated code amount or lowered when picture quality is degraded by using coding parameter such as quantization step width or coding mode (intra-coding or predictive-coding).

A visually-suitable picture rate can be set according to motion activity of an incoming moving-picture video signal. Coding parameters may also be used.

As already discussed, a moving-picture video signal mostly carries 60 frames (or fields) according to a limit on, detection of a flicker on screen, however, such number of frames (or fields) are not always required for every moving picture. For example, cinema films require 24 fps, so that un-smooth movement (jaggy movement, etc.) is noticeable only for rapidly moving scenes at 30 fps, however, not noticeable at 20 fps whereas noticeable at a further lower rate, except stationary scenes.

Therefore, decimation control, in which a picture rate is switched among 60 fps only for rapid movement, 30 fps for frequent movement, 20 fps for infrequent movement, and 10 to 15 fps for almost stationary scenes, offers smooth and natural movement on screen when moving pictures are reproduced.

A picture rate (R) can be obtained according to the equation (1) already disclosed in the technique (1) for the first embodiment of the variable picture rate coding apparatus (FIG. 1). Such picture rate (R) can also be obtained according to the technique (2).

(Second Embodiment of Variable Picture Rate Decoding Apparatus)

Figure 9:
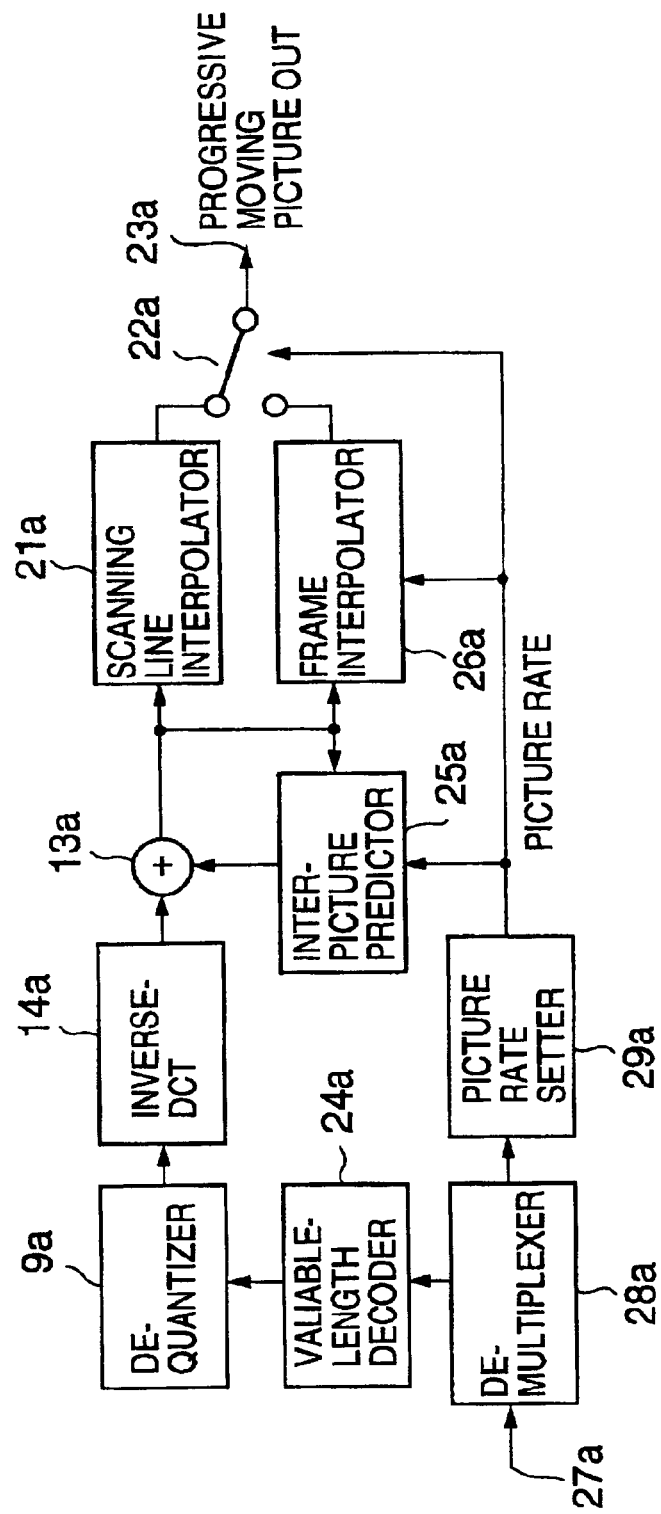
FIG. 9 is a block diagram of the second preferred embodiment of a variable picture rate decoding apparatus according to the present invention.

FIG. 9 is a block diagram of the second preferred embodiment of a variable picture rate decoding apparatus according to the present invention, which is applicable to process a bitstream supplied by the coding apparatus shown in FIG. 7.

A bitstream, for example, supplied by the variable picture rate coding apparatus shown in FIG. 7, is supplied to a de-multiplexer 28a, through an input terminal 27a, and separated into a moving-picture bitstream and picture rate data that has been used in coding.

The moving-picture bitstream and the picture rate data are supplied to a variable-length decoder 24a and a picture rate setter 29a, respectively.

The picture rate setter 29a detects a frame (field) number, etc., of the picture rate data and sets a picture rate. The set picture rate is supplied to an inter-picture predictor 25a, a frame interpolator 26a and a switch 22a.

The variable-length decoder 24a converts the variable-length codes of the moving-picture bitstream into the original fixed-length codes. The fixed-length codes are supplied to a de-quantizer 9a and converted into coefficients. The coefficients are supplied to an inverse-DCT 14a to reproduce a predictive error signal for each (8×8) coefficients. The predictive error signal is supplied to an adder 13a, to which a predictive signal is added, to reproduce a moving-picture video signal.

The reproduced moving-picture video signal is supplied to the inter-picture predictor 25a, a scanning line interpolator 21a and the frame interpolator 26a.

The inter-picture predictor 25a produces a predictive signal by using a pre-stored moving-picture video signal. In detail, an interlaced predictive signal is produced when the picture rate is 60 fps whereas a progressive predictive signal is produced when the picture rate is 30 fps or lower. The produced predictive signal is supplied to the adder 13a.

The scanning line interpolator 21a interpolates scanning lines to the reproduced video signal, which have been decimated by interlaced scanning, to produce a 60 fps-progressive moving-picture video signal. The progressive signal is supplied to the switch 22*a*.

The frame interpolator 26*a* interpolates frames which have been decimated to the reproduced video signal, to produce a 60 fps-progressive moving-picture video signal. This progressive signal is also supplied to the switch 22*a*.

Figure 10:
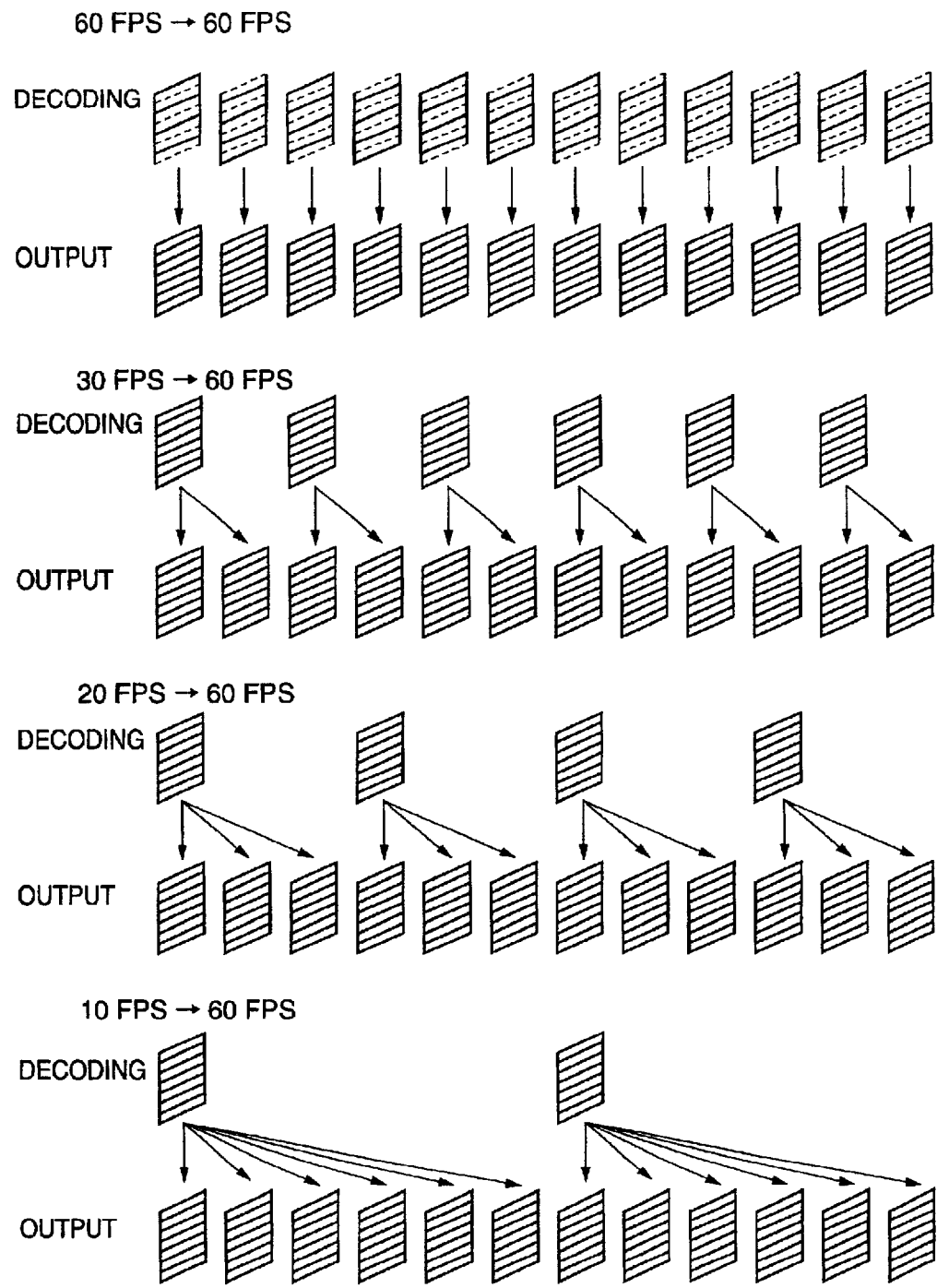
FIG. 10 illustrates frame interpolation according to the second embodiment shown in FIG. 9.

Frame interpolation depends on picture rate as illustrated in FIG. 10.

In detail, at 30 fps, interpolation is performed to have successive two frames of the same picture of the reproduced moving-picture video signal.

At 20 fps, interpolation is performed to have successive three frames of the same picture of the reproduced moving-picture video signal.

At 15 fps, interpolation is performed to have successive four frames of the same picture of the reproduced moving-picture video signal.

Moreover, at 10 fps, interpolation is performed to have successive six frames of the same picture of the reproduced moving-picture video signal.

The switch 22*a* selects the 60 fps-progressive moving-picture video signal that has been scanning line-interpolated by the scanning line interpolator 21*a* when the picture rate is 60 fps.

On other hand, the switch 22*a* selects the 60 fps-progressive moving-picture video signal that has been frame-interpolated by the frame interpolator 26*a* when the picture rate is 30 fps or lower.

The selected progressive moving-picture video signal is output through an output terminal 23*a*.

(Fourth Embodiment of Variable Picture Rate Coding Apparatus)

Figure 11:
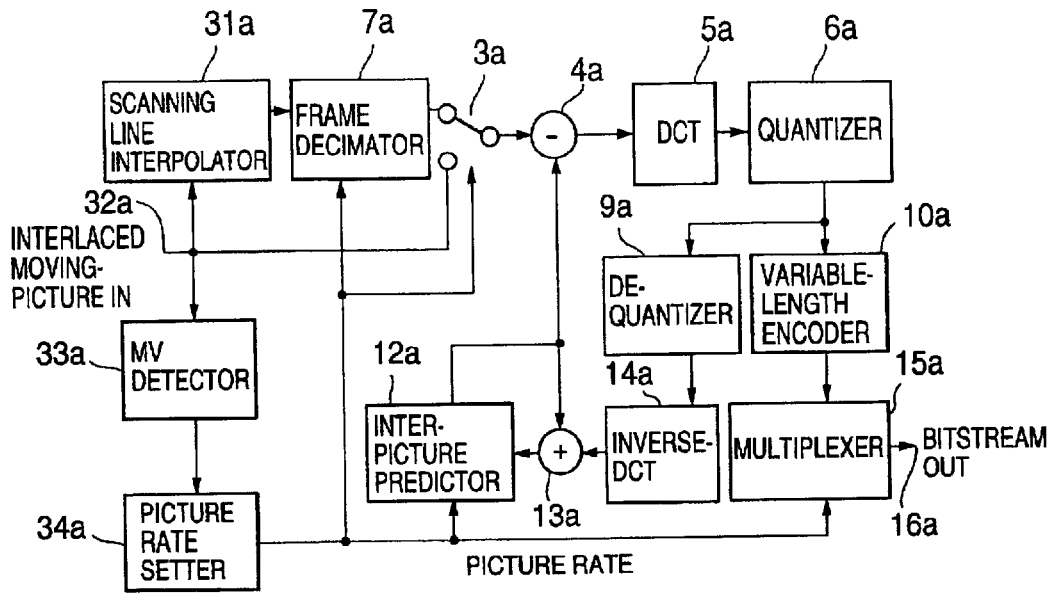
FIG. 11 is a block diagram of the fourth preferred embodiment of a variable picture rate coding apparatus according to the present invention.

FIG. 11 is a block diagram of the fourth preferred embodiment of a variable picture rate coding apparatus according to the present invention.

Elements in this embodiment that are the same as or analogous to elements in the third embodiment (FIG. 7) are referenced by the same reference numbers and will not be described in detail.

Instead of the scanning line decimator 2*a* (FIG. 7), the third embodiment is provided with a scanning line interpolator 31*a*.

The difference between the third embodiment (FIG. 7) and the fourth embodiment (FIG. 11) is that, the former accepts a progressive moving-picture video signal whereas the latter accepts an interlaced moving-picture video signal.

An incoming interlaced moving-picture video signal at a picture rate of 60 fps is supplied to the scanning line interpolator 31*a*, a switch 3*a* and a motion vector (MV) detector 33*a* through an input terminal 32*a*.

The scanning line interpolator 31*a* interpolates scanning lines, that have been decimated by interlaced scanning, to the incoming video signal to produce a progressive moving-picture video signal. The progressive video signal is supplied to a frame decimator 7*a*. A picture rate of the signal output by the scanning line interpolator 31*a* may be 60 fps or 30 fps at this stage because it is lowered at least to 30 fps by the frame decimator 7*a*.

The frame decimator 7*a* decimates frames of the progressive video signal to lower picture rate from 60 fps to 30, 20, 15 and 10 fps and supplies the picture rate-lowered progressive video signal to the switch 3*a*.

The switch 3*a* selects the incoming 60 fps-interlaced video signal through the input terminal 32*a* when picture rate data sent from a picture rate setter 34*a* indicates a picture rate of 60 fps. On the other hand, the switch 3*a* selects the picture rate-lowered progressive video signal from the frame decimator 7*a* when the picture rate data indicates a picture rate 30 fps or lower.

The selected moving-picture video signal is supplied to the subtracter 4*a*, the DCT 5*a*, the quantizer 6*a*, the variable-length encoder 10*a*, the de-quantizer 9*a*, the inverse-DCT 14*a*, the adder 13*a*, and the inter-picture predictor 12*a*, for inter-picture predictive coding, and the multiplexer 15*a*, the processing performed by theses devices are the same as that performed by the counterparts in the third embodiment (FIG. 7).

Other differences between the third and the fourth embodiments are as follows:

In the former, the MV detector 8*a* detects motion vector of the incoming progressive moving-picture video signal whereas in the latter, the MV detector 33*a* detects motion vector of the incoming interlaced moving-picture video signal.

Since the magnitudes of the motion vector detected by the MV detectors 8*a* and 33*a* are different, the MV detector 33*a* compensates for the motion vector difference to obtain a motion vector.

(Third Embodiment of Variable Picture Rate Decoding Apparatus)

Figure 12:
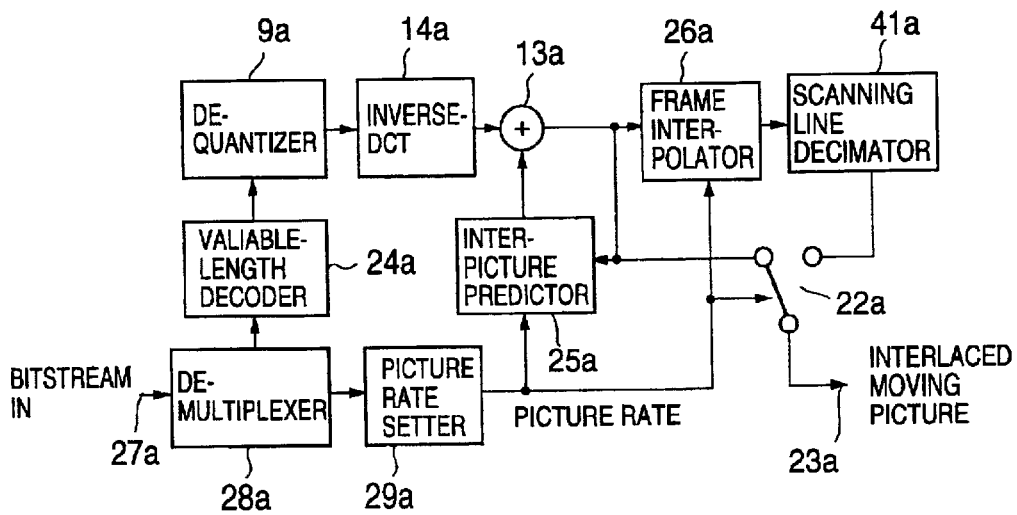
FIG. 12 is a block diagram of the third preferred embodiment of a variable picture rate decoding apparatus according to the present invention.

FIG. 12 is a block diagram of the third preferred embodiment of a variable picture rate decoding apparatus according to the present invention, which is applicable to process a bitstream supplied by the coding apparatus shown in FIG. 11.

Elements in this embodiment that are the same as or analogous to elements in the second embodiment (FIG. 9) are referenced by the same reference numbers and will not be described in detail.

The difference between the second embodiment (FIG. 9) and the third embodiment (FIG. 12) is that, instead of the scanning line interpolator 21*a* (FIG. 9), the latter is provided with a scanning line decimator 41*a*.

A bitstream, for example, supplied by the variable picture rate coding apparatus shown in FIG. 11, is supplied to the de-multiplexer 28*a* through the input terminal 27*a*.

A moving-picture video signal is reproduced through the variable-length decoder 24*a*, the de-quantizer 9*a*, the inverse-DCT 14*a*, the adder and the inter-picture predictor 25*a*, which perform the same processing as the counterparts in FIG. 9.

The reproduced moving-picture video signal is supplied to the frame interpolator 26*a* and the switch 22*a*.

The frame interpolator 26*a* interpolates progressive frames that have been decimated to the reproduced video signal to produce a 60 fps-progressive moving-picture video signal.

Figure 13:
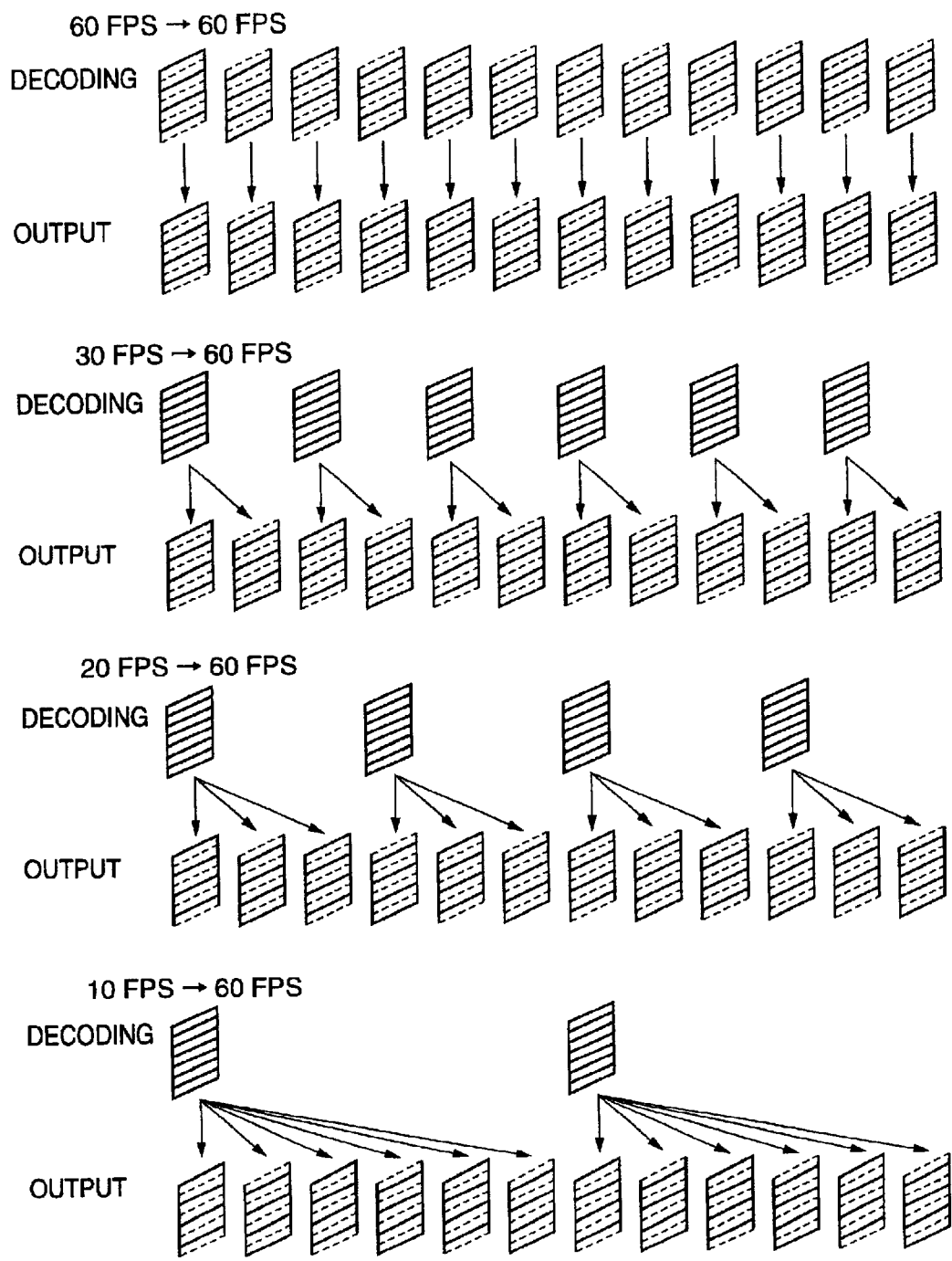
FIG. 13 illustrates frame interpolation according to the third embodiment shown in FIG. 12.

Frame interpolation depends on picture rate set by the picture rate setter 29*a* as illustrated in FIG. 13.

In detail, at 30 fps, interpolation is performed to have successive two frames of the same picture of the reproduced moving-picture video signal.

At 20 fps, interpolation is performed to have successive three frames of the same picture of the reproduced moving-picture video signal.

At 15 fps, interpolation is performed to have successive four frames of the same picture of the reproduced moving-picture video signal.

Moreover, at 10 fps, interpolation is performed to have successive six frames of the same picture of the reproduced moving-picture video signal.

The frame-interpolated 60 fps-progressive video signal is supplied to the scanning line decimator 41*a*, to be subjected to scanning line decimation, thus each progressive frame being converted into an interlaced field. The scanning line decimator 41a then outputs a 60 fps-interlaced moving-picture video signal. The frame interpolation and scanning line decimation processing can be united for no requirement of high-speed 60 fps-progressive signal input and output.

The switch 22a selects the 60 fps-interlaced moving-picture video signal output by the adder 13a when the picture rate is 60 fps.

On other hand, the switch 22a selects the 60 fps-interlaced moving-picture video signal that has been scanning line-decimated by the scanning line decimator 41a when the picture rate is 30 fps or lower.

The selected interlaced moving-picture video signal is output through the output terminal 23a.

(Fifth Embodiment of Variable Picture Rate Coding Apparatus)

Figure 14:
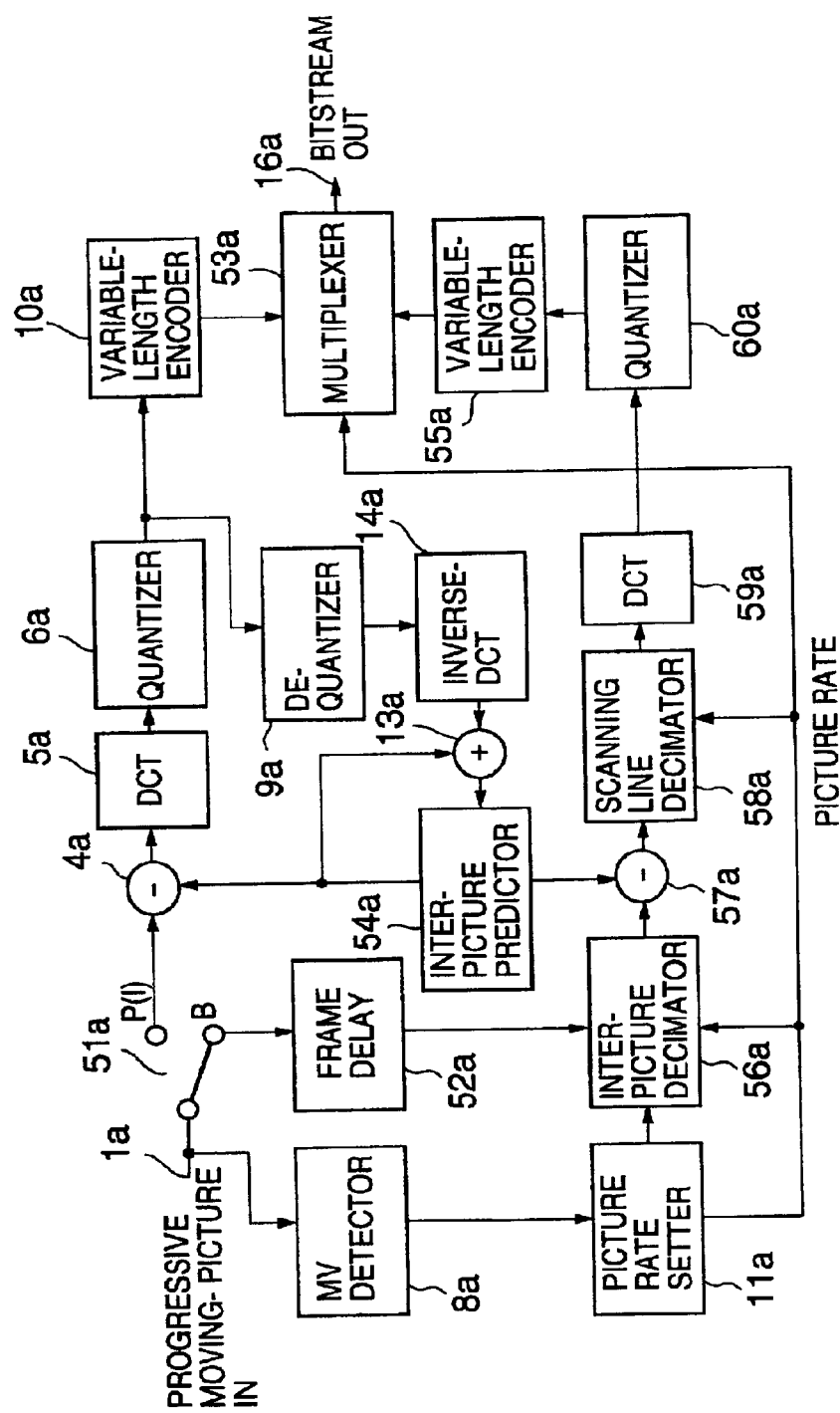
FIG. 14 is a block diagram of the fifth preferred embodiment of a variable picture rate coding apparatus according to the present invention.

FIG. 14 is a block diagram of the fifth preferred embodiment of a variable picture rate coding apparatus according to the present invention.

Elements in this embodiment that are the same as or analogous to elements in the third embodiment (FIG. 7) are referenced by the same reference numbers and will not be described in detail.

The difference between the third and the fifth embodiments is that, in the latter, frame and scanning line decimation are applied to B-pictures and predictive error signals, respectively.

An incoming 60 fps-progressive moving-picture video signal is supplied to a switch 51a through an input terminal 1a.

The switch 51a supplies one I- or P-picture to a subtracter 4a for every sixth frame and the remaining B-pictures to a frame delay unit 52a.

The P(I)-picture moving-picture video signal is supplied to the subtracter 4a, the DCT 5a, the quantizer 6a, the de-quantizer 9a, the variable-length encoder 10a, the adder 13a and the inverse-DCT 14a, and coded to be a bitstream, in the same process as the third embodiment. The bitstream is supplied to a multiplexer 53a.

The B-picture moving-picture video signal has been delayed by a frame delay unit 52a until completion of coding of the preceding P(I)-pictures. In this embodiment, 5-frame B-picture moving-picture video signal has been delayed for 6-frame period because P(I)-pictures have been supplied for every 6th-frame.

Figure 15:
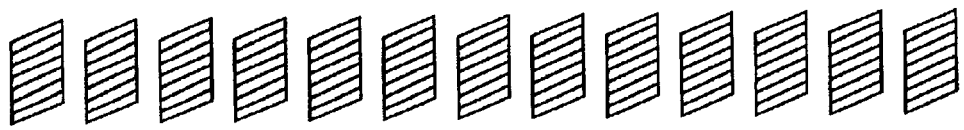
FIG. 15 illustrates B-picture decimation according to the fifth embodiment shown in FIG. 14.
Figure 15:
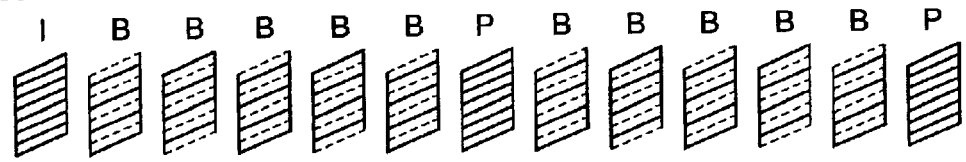
Figure 15:
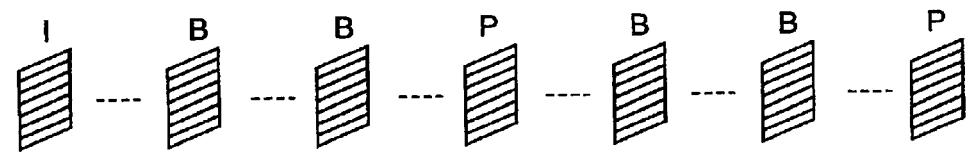
Figure 15:
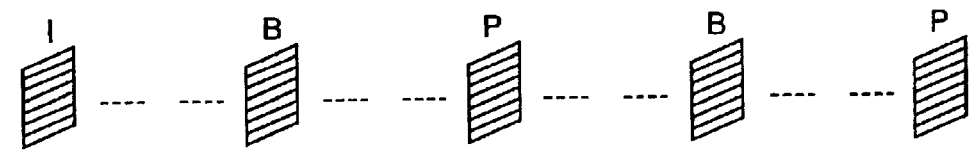
Figure 15:
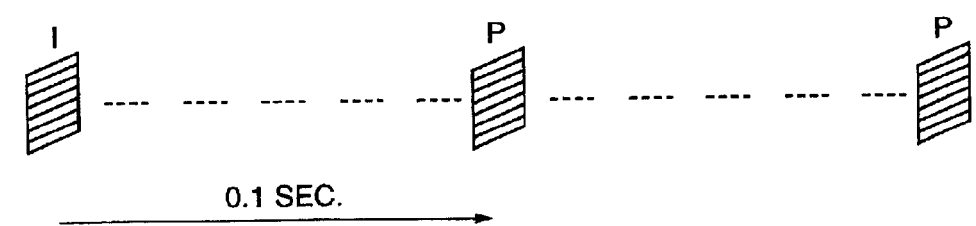

The delayed B-picture moving-picture video signal is supplied to a frame decimator 56a for B-picture decimation. B-pictures to be decimated are decided according the a picture rate set by a picture rate setter 11a so that the remaining B-pictures and the preceding and the following P(I)-pictures after decimation are arranged at a constant interval, as illustrated in FIG. 15. The picture rate of 15 fps used in the third embodiment is not applied to the fifth embodiment because the remaining frames do not synchronize with P(I)-pictures.

The moving-picture video signal carrying the remaining B-pictures is supplied to a subtracter 57a. The subtracter 57a subtracts a predictive signal sent from an inter-picture predictor 54a from the video signal carrying the remaining B-pictures to produce a predictive error signal.

The predictive error signal is supplied to a scanning line decimator 58a and decimated to interlaced fields only when the picture rate is 60 fps.

The interlaced predictive error signal is supplied to a DCT 59a, a quantizer 60a and a variable-length encoder 55a.

The DCT 59a, the quantizer 60a and the variable-length encoder 55a perform the same processing as the DCT 5a, the quantizer 6a and the variable-length encoder 10a, the difference being quantizing parameters only.

A bitstream generated by the variable-length encoder 55a and also the picture rate set by the picture rate setter 11a is multiplexed by the multiplexer 53a with the P(I)-picture bitstream generated by the variable-length encoder 10a, and output through an output terminal 16a.

The inter-picture predictor 54a outputs a predictive signal to the subtracter 4a and the adder 13a for the P(I)-pictures, like the third embodiment (FIG. 7), while generates a predictive signal based on preceding and upcoming pictures, which is supplied to the subtracter 57a.

The MV detector 8a and the picture rate setter 11a function like the counterparts shown in FIG. 7, except that the setter 11a (FIG. 14) does not set a picture rate at a 15 fps.

(Fourth Embodiment of Variable Picture Rate Decoding Apparatus)

Figure 16:
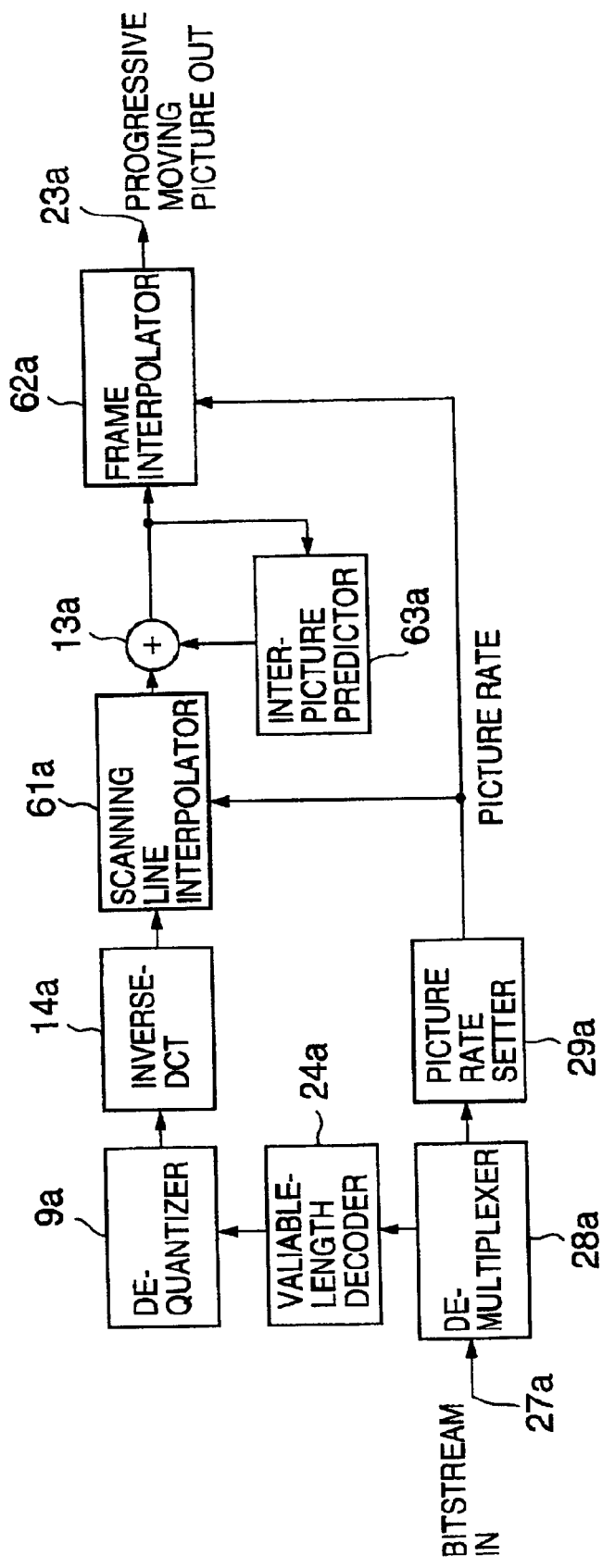
FIG. 16 is a block diagram of the fourth preferred embodiment of a variable picture rate decoding apparatus according to the present invention.

FIG. 16 is a block diagram of the fourth preferred embodiment of a variable picture rate decoding apparatus according to the present invention, which is applicable to process a bitstream supplied by the coding apparatus shown in FIG. 14.

Elements in this embodiment that are the same as or analogous to elements in the second embodiment (FIG. 9) are referenced by the same reference numbers and will not be described in detail.

A bitstream, for example, supplied by the variable picture rate coding apparatus shown in FIG. 14, is supplied, for any picture, to the de-multiplexer 28a, through the input terminal 27a, and further to the variable-length decoder 24a, the de-quantizer 9a, the inverse-DCT 14a for production of a predictive error signal.

The predictive error signal is supplied to a scanning line interpolator 61a that interpolates scanning lines that have been decimated by interlaced scanning to the B-picture predictive error signal at picture rate of 60 fps only.

The adder 13a adds a predictive signal sent from an inter-picture predictor 63a to the predictive error signal and supplies the resultant signal to a frame interpolator 62a and the inter-picture predictor 63a. The predictor 63a produces progressive predictive signals that are different between the B-pictures and P(I)-pictures.

The frame interpolator 62a interpolates frames for progressive scanning that have been decimated to the output signal of the adder 13a to produce a 60 fps-progressive moving-picture video signal which is output through the output terminal 23a.

Frame interpolation depends on picture rate as follows:

At 30 fps, interpolation is performed to have successive two frames of the same picture of the decoded moving-picture video signal to reproduce moving-picture video signal.

At 20 fps, interpolation is performed to have successive three frames of the same picture of the decoded moving-picture video signal to reproduce moving-picture video signal.

Moreover, at 10 fps, interpolation is performed to have successive six frames of the same picture of the decoded moving-picture video signal to reproduce moving-picture video signal.

Since, B-pictures and the I(P)-pictures are input in the reverse order, the frame interpolator 62a outputs the moving-picture video signal with correction of the order.

(First Embodiment of Moving-Picture Scanning-Type Converting Apparatus)

Figure 17:
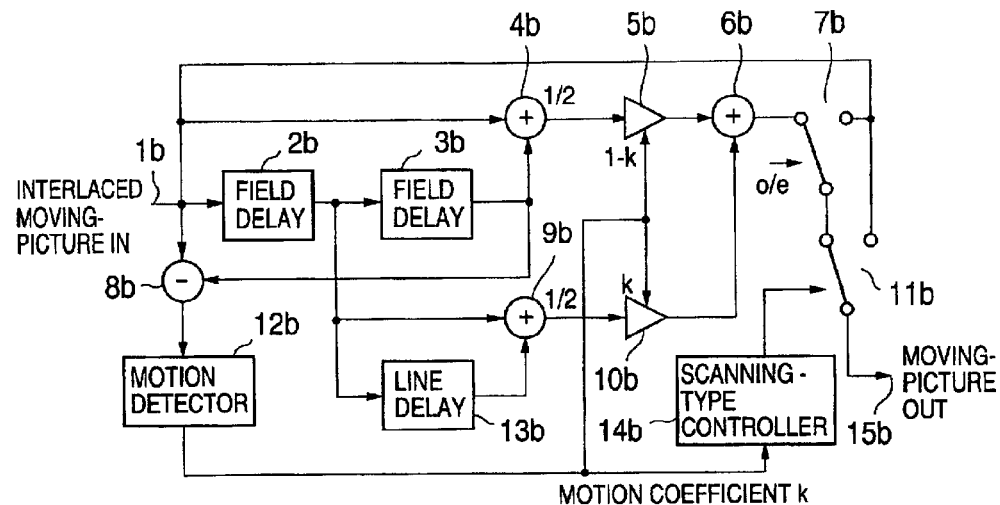
FIG. 17 is a block diagram of the first preferred embodiment of a moving-Picture scanning-type converting apparatus according to the present invention.

FIG. 17 is a block diagram of the first preferred embodiment of a moving-Picture scanning-type converting apparatus according to the present invention.

An incoming 60 fps-interlaced moving-picture video signal is supplied to a field delay unit 2b, an adder 4b and a subtracter 8b.

The field delay unit 2b delays the incoming 60 fps-interlaced video signal by one field (262 lines). The delayed signal is supplied to a field delay unit 3b, an adder 9b and line delay unit 13b.

The field delay unit 3b delays the delayed video signal by one field (262 lines) and supplies the further delayed signal to an adder 4b and a subtracter 8b.

The incoming video signal and the signal delayed by the field delay units 2b and 3b by one frame (525 lines) in total are added to each other by the adder 4b for producing an inter-filed interpolated signal whereas the delayed signal is subtracted from the incoming signal by the subtracter 8b for producing an interfield difference signal.

The 262 line-delayed signal of the field delay unit 2b is delayed by the line delay unit 13b by one line to be a 263 line-delayed signal. The 263 line-delayed signal is added to the 262 line-delayed signal by the adder 9b to be an inter-field interpolated signal.

The inter-field interpolated signal is supplied to a multiplier 10b. Also supplied to the multiplier 10b is a motion coefficient "K", from 0 to 1 which is generated by a motion detector 12b for each pixel. The motion coefficient "K" is further supplied to a multiplier 5b and a scanning-type controller 14b.

The multiplier 5b multiplies the inter-field interpolated signal and (1−K) while the multiplier 10b multiples the inter-field interpolated signal and "K". The resultant multiplied signals are added to each other by an adder 6b to be an interpolated signal. The interpolated signal of the adder 6b is supplied to a switch 7b.

The switch 7b selects the incoming interlaced video signal for odd fields whereas selects the interpolated signal of the adder 6b for even fields of the incoming signal. The selected signal is supplied to a switch 11b. The selected signal is a 60 fps-interlaced signal, however, it is also a 30 fps-progressive signal because the interpolated signal is composed of interpolated scanning liens delayed by one filed so that two fields have the same video data in time.

For each frame of the incoming 60 fps-interlaced moving-picture video signal, the switch 11b selects the incoming signal when scanning-type data supplied by the scanning-type controller 14b indicates interlaced scanning whereas it selects the 30 fps-progressive signal of the switch 7b when the scanning-type data indicates progressive scanning. The interlaced/progressive-switching is performed in synchronism with the frames of the incoming signal, not with the fields or scanning lines within one frame.

The scanning-type controller 14b decides a scanning type in accordance with the motion coefficient "K" as control data. In detail, the controller 14b accumulates the motion coefficient "K" for one frame to obtain an average frame value. When the average frame value is equal to or larger than a predetermined value, such as, 0.2, the controller 14b judges that the incoming signal has a large motion activity to select interlaced scanning. On the contrary, When the former value is smaller than the latter value, the controller 14b judges that the incoming signal has a small motion activity to select progressive scanning.

Figure 18:
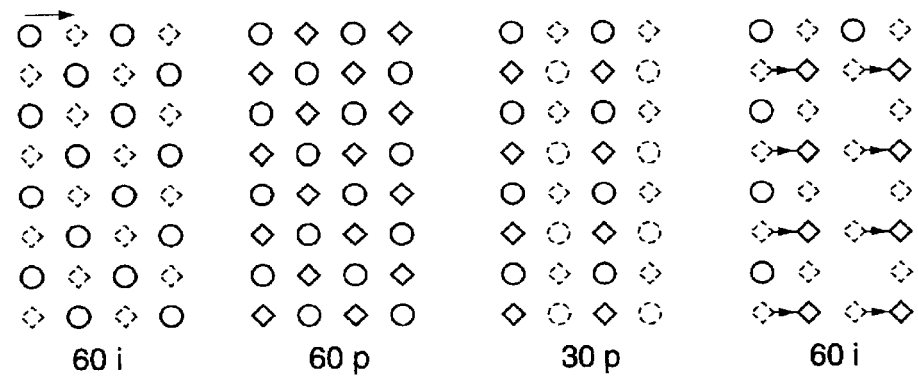
FIG. 18 illustrates scanning-type conversion from interlaced scanning.

The scanning-type control is illustrated in FIG. 18. The marks "○" and "◇" indicate the incoming 60 fps-interlaced moving-picture video signal and the scanning lines to be interpolated, respectively. The scanning lines correspond to the scanning lines that have been decimated by interlaced scanning. The same marks but indicated by dashed lines represent no scanning lines thereon.

As illustrated, the incoming interlaced video signal "60i" is converted into the progressive video signal "60p". The scanning lines to be interpolated are produced by one field-delay by interpolation from the preceding and upcoming fields.

The output scanning lines for interpolation correspond to the incoming scanning lines of the preceding field because the incoming scanning lines appear with no field delay. Therefore, as illustrated, either even fields or odd fields of the incoming interlaced scanning lines and the corresponding scanning lines for interpolation are generated. The output 30 fps-progressing signal "30p" is divided into two fields that corresponds to an interlaced video signal "60i".

(Second Embodiment of Moving-Picture Scanning-Type Converting Apparatus)

Figure 19:
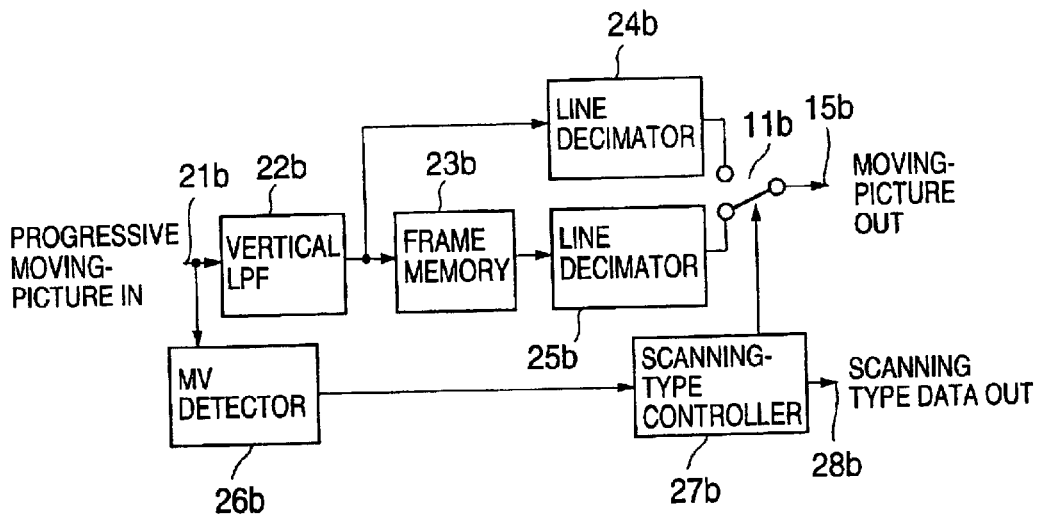
FIG. 19 is a block diagram of the second preferred embodiment of a moving-picture scanning-type converting apparatus according to the present invention.

FIG. 19 is a block diagram of the second preferred embodiment of a moving-picture scanning-type converting apparatus according to the present invention.

Elements in this embodiment that are the same as or analogous to elements in the first embodiment (FIG. 17) are referenced by the same reference numbers and will not be described in detail.

An incoming 60 fps-progressive moving-picture video signal is supplied to a vertical low-pass filter (LPF) 22b and a motion vector (MV) detector 26b through an input terminal 21b.

The LPF 22b suppresses high frequency components of the incoming video signal with the frequency characteristics in which the input signal is suppressed to half at 70% of the maximum frequency. This bandwidth suppression eliminates a strong flicker that might otherwise be noticed on screen by interlaced scanning.

The band-suppressed progressive signal is supplied to a frame memory 23b and also a line decimator 24b.

The frame memory 23b stores the progressive video signal for one frame and outputs successive two frames of the same picture to a line decimator 25b.

The input and the output frame rate to and from the frame memory 23b are the same with each other so that every second frame of the input signal is decimated, thus the half number of the input frames being output.

The line decimators 24b and 25b store the input signal for one scanning line and output the signal at an output rate half the input rate so that every second scanning line is decimated.

The scanning lines to be decimated depend on the even and the odd frames of the incoming progressive video signal. The line decimator 24b decimates the scanning lines of the incoming 60 fps-progressive video signal to produce a 60 fps-interlaced video signal. On the other hand, the line decimator 25b performs line decimation so that the even and the odd scanning lines of the input two successive frames of the same picture are separated, thus producing a 60 fps-interlaced video signal that carries a 30 fps-progressive moving-picture.

A switch 11b selects the 60 fps-interlaced video signal of the line decimator 24b when scanning-type data supplied by a scanning-type controller 27b indicates interlaced scanning whereas it selects the 30 fps-progressive moving-picture video signal of the line decimator 25b when the scanning-type data indicates progressive scanning. The switching is performed in synchronism with interlaced frames, not with the fields or scanning lines within one frame.

The MV detector 26b detects a motion vector for one frame difference per (16×16) block of the incoming 60 fps-progressive moving-picture video signal. The detected MV is supplied to the scanning-type controller 27b.

The scanning-type controller 27b obtains a motion activity (moving distance) for each block based on the detected MV to obtain one frame-average motion activity. When the one frame-average motion activity is equal to or larger than a predetermined value, such as, four pixels, the controller 27b judges that the incoming signal has a large motion activity to select interlaced scanning. On the contrary, When the former value is smaller than the latter value, the controller 27b judges that the incoming signal has a small motion activity to select 30 fps-progressive scanning.

The scanning-type data indicating interlaced or progressive scanning is supplied to the switch 11b and also output through an output terminal 28b.

Figure 20:
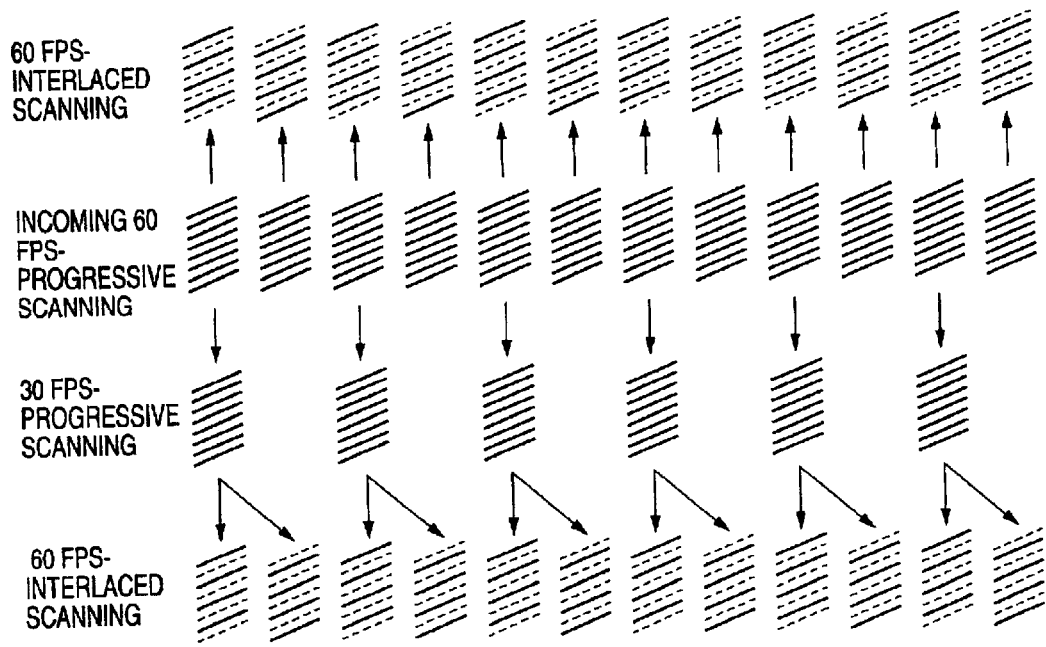
FIG. 20 illustrates scanning-type conversion from progressive scanning.

The scanning-type conversion from progressive scanning in this embodiment is illustrated in FIG. 20.

As illustrated, the incoming 60 fps-progressive moving-picture video signal is converted into the 60 fps-interlaced video signal or the 30 fps-progressive video signal. Each frame of the 30 fps-progressive signal is divided into two fields, thus the 30 fps-progressive signal becoming in the form of the 60 fps-interlaced signal. The content of the pictures is switched between 60 fps-interlaced scanning and 30 fps-progressive scanning.

(Embodiment of Moving-Picture Coding Apparatus)

Figure 21:
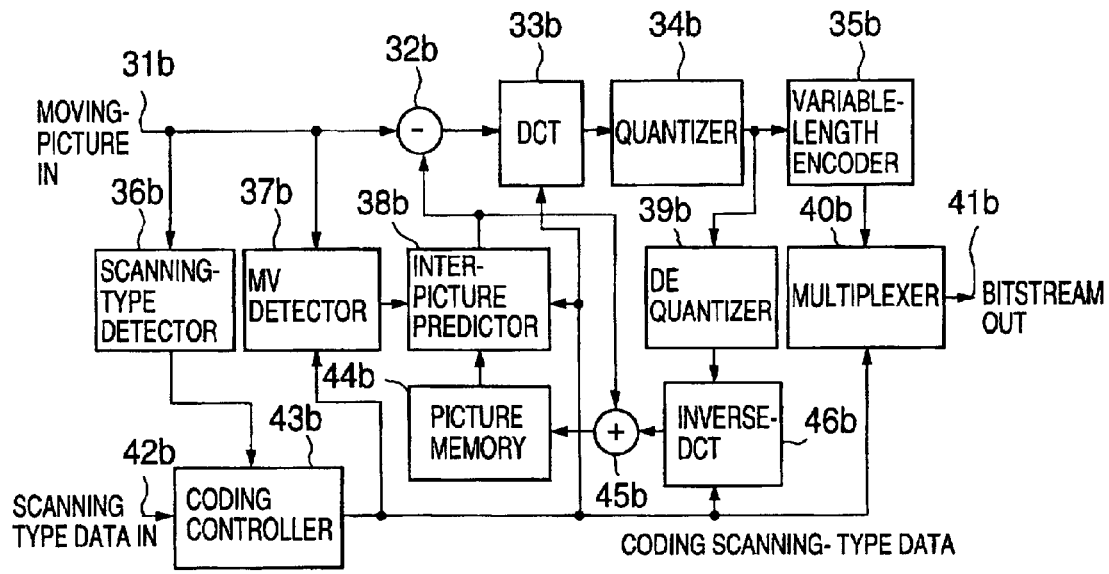
FIG. 21 is a block diagram of a preferred embodiment of a moving-picture coding apparatus.

FIG. 21 is a block diagram of a preferred embodiment of a moving-picture coding apparatus, which is applicable to process a moving-picture video signal supplied by the moving-picture scanning-type converting apparatus shown in FIG. 19.

A 60 fps-interlaced moving-picture video signal, for example, supplied by the moving-picture scanning-type converting apparatus shown in FIG. 19, is supplied to a subtracter 32b, a scanning-type detector 36b and a MV detector 37b.

A predictive signal supplied by an inter-picture predictor 38b is subtracted from the incoming video signal by the subtracter 32b to produce a predictive error signal.

The predictive error signal is supplied to a DCT 33b and is transformed into DCT coefficients by DCT transformation. The DCT coefficients are supplied to a quantizer 34b and quantized at a predetermined step width to be fixed-length codes.

The fixed-length codes are supplied to a variable-length encoder 35b and a de-quantizer 39b.

The variable-length encoder 35b compresses the fixed-length of predictive error signal using variable-length codes. The resultant variable-length codes of predictive error signal is supplied to a multiplexer 40b.

The fixed-length codes supplied to the de-quantizer 39b is further supplied to an inverse-DCT 46b. The de-quantizer 39b and the inverse-DCT 46b perform processing that is reverse of processing performed by the DCT 33b and quantizer 34b, to reproduce the predictive error signal.

The reproduced predictive error signal is supplied to an adder 45b and added to a predictive signal, to reproduce a moving-picture signal. The reproduced moving-picture signal is stored in a Picture Memory 44b and then supplied to an inter-picture predictor 38b.

The inter-picture predictor 38b performs motion compensation to the reproduced moving-picture signal based on a motion vector supplied by the MV detector 37b, to produce a predictive signal which is supplied to the subtractor 32b and the adder 45b.

The MV detector 37b detects a spatial movement amount of a reference frame with respect to a frame to be coded for every (16×16) or (16×8) pixels. The detected spatial movement amount is supplied as a motion vector to the inter-picture predictor 38b.

The MV detector 37b, the inter-picture predictor 38b, the DCT 33b and the inverse-DCT 46b are switched per frame on their processing between interlaced and progressive scanning in accordance with scanning-type data supplied by a coding controller 42b. The scanning-type data may, for example, be sent from the moving-picture scanning-type converting apparatus shown in FIG. 19 or supplied by the scanning-type detector 36b.

The MV detector 37b, the inter-picture predictor 38b, the DCT 33b and the inverse-DCT 46b perform regular inter-frame coding when the scanning-type data indicates progressive scanning. On the other hand, when the scanning-type data indicates interlaced scanning, the inter-picture predictor 38b performs field/frame adaptive prediction, the MV detector 37b obtaining a motion vector suitable for the field/frame adaptive prediction, and the DCT 33b and inverse-DCT 46b perform coefficient transformation by field/frame adaptive processing.

The scanning-type detector 36b determines whether an incoming frame carries a progressive or interlaced picture.

Figure 22:
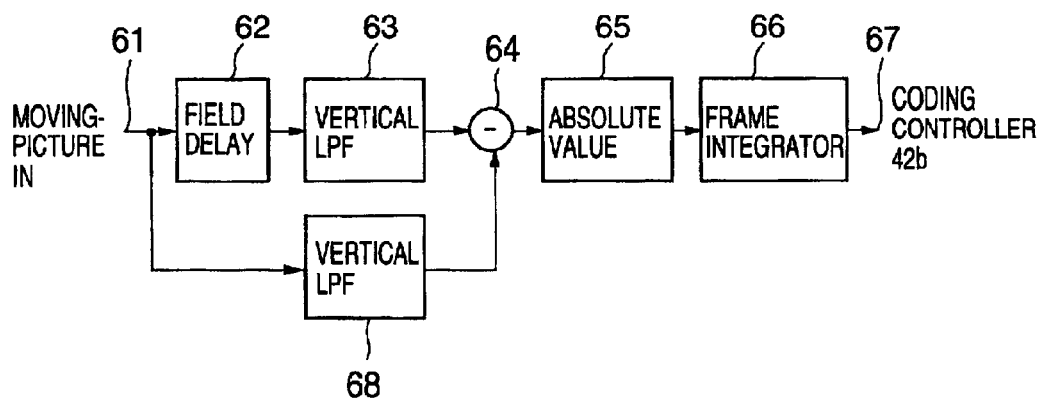
FIG. 22 is a block diagram of the scanning-type detector shown in FIG. 21.

FIG. 22 is a block diagram of the scanning-type detector 36b.

An incoming interlaced video signal is supplied to a field delay unit 62 and a vertical LPF 68. The incoming signal is delayed by 262 lines and supplied to a vertical LPF 63.

The vertical LPFs 63 and 68 narrow the bandwidth in the vertical direction of the 262 line-delayed signal and the incoming signal, respectively, to ⅓ to ¼. Since the incoming signal and the 262 line-delayed signal are displaced by 0.5 lines with each other, the vertical LPF 63 delays the output phase by 0.5 lines, thus the output of the vertical LPFs 63 and 68 being located at the same position in the vertical direction and their high frequency components being suppressed.

The vertical LPFs 63 and 68 produce no difference from the same frame when the incoming signal is a progressive signal On the other hand, the vertical LPFs 63 and 68 produce different signals from different pictures when the incoming signal is an interlaced signal. The different signals are supplied to a subtracter 64 to produce an error signal.

An absolute value of the error signal is taken out by an absolute value unit 65 and supplied to a frame integrator 66. The frame integrator 66 obtains one frame average value and compares the average value with a predetermined threshold value, thus judging the incoming signal as an interlaced signal when the average value is larger than or equal to the threshold value whereas a progressive signal when the former is smaller than the latter. The judgement is supplied to the coding controller 43b (FIG. 21).

The scanning-type detector 36b may give mis-judgement when an incoming video has a small motion activity because an interlaced video and a progressive video resemble with each other when motion activity is small. Coding an interlaced video with such a small motion activity as a progressive video, however, does not raise any big problem.

Conversion of incoming progressive signal into frames with detection of vertical high frequency frame component also offers judgement of scanning-type of the incoming signal.

The coding controller 43b (FIG. 21) decides for each interlaced frame whether to use the scanning-type data sent through an input terminal 42b or from the scanning-type detector 36b for interlaced coding or 30 fps-progressive coding.

As disclosed above, the variable picture rate coding apparatus and method according to the present invention decimate step by step only pictures that are not used as reference pictures for inter-picture predictive coding, thus giving no affection of decimation to pictures to be used as the reference pictures with no change in distance between pictures for inter-picture prediction for achieving an adequate predictive efficiency.

The degree of decimation of pictures that are not used as the reference pictures is varied step by step. The present invention thus offers a picture rate enough for human visual performance on movement and further offers a low transfer bit rate enough for maintaining quality of reproduced pictures. A constant transfer bit rate achieves allocation of more bits by means of pictures that remain without decimation, thus further improving reproduced picture quality.

The variable picture rate decoding apparatus and method according to the present invention judge a decimation rate of a reproduced picture for interpolation of reproduced moving pictures to regain a picture rate before coding, thus minimizing motion unnaturalness of the reproduced moving pictures.

Moreover, the variable picture rate decoding apparatus and method according to the present invention set a coding picture rate for each picture portion of a moving picture incoming at a given picture rate, in accordance with motion activity of the incoming moving picture or a coding parameter for coding the incoming moving picture for interlaced coding when the set picture rate and the given picture rate are equal to each other whereas for progressive scanning when the former rate is lower than the latter rate.

The present invention thus achieves fine adjustment of picture rate enough for human visual performance on movement and further offers a low transfer bit rate enough for maintaining quality of reproduced pictures. In this apparatus and method, a constant transfer bit rate also achieves allocation of more bits by means of pictures that remain without decimation, thus further improving reproduced picture quality.

Moreover, the variable picture rate decoding apparatus and method according to the present invention reproduce pictures as they are by interlaced decoding when they have been coded under interlaced scanning. On the other hand, pictures coded under progressive scanning are subjected to interpolation of scanning lines. Pictures coded under progressive scanning at a lowered picture rate are subjected to generation of successive frames of the same picture in progressive decoding whereas to repeated separation of each frame of pictures coded under progressive scanning into an even and an odd field in interlaced decoding, thus minimizing motion unnaturalness of the reproduced moving pictures.

Moreover, the moving-picture scanning-type conversion apparatus and method set a scanning type in accordance with motion activity of an incoming moving picture for conversion of scanning type of the incoming moving picture, and switching and outputting interlaced pictures at a picture rate the same as the incoming moving picture and progressive pictures.

Moreover, moving-picture coding apparatus and method perform coding under scanning type set in accordance with motion activity of an incoming moving picture.

A combination of moving-picture scanning-type conversion and moving-picture coding according to the present invention achieves progressive coding at a lowered picture rate for slowly moving picture portions that will rarely suffer decrease in image quality even if a picture rate is lowered whereas interlaced coding with no change of picture rate for rapidly moving picture portions.

A bit rate for coding of progressive pictures is thus drastically lowered compared to that for coding of interlaced pictures. The present invention therefore lowers a coding bit rate with maintaining subjective picture quality. On the other hand, the same bit rate for both coding of progressive and interlaced pictures improves reproduced image quality.

Furthermore, the moving-picture scanning-type conversion according to the present invention is applicable to a well-known coding apparatus for the same advantages discussed above with a waste of few adaptive bit data.

What is claimed is:

1. A moving-picture scanning-type conversion apparatus comprising:

a scanning-type setter to set a scanning type for each frame of an interlaced moving picture incoming at a given frame rate, in accordance with motion activity of the incoming moving picture, wherein the scanning rate is set to interlaced scanning when an average value of the motion activity for each frame is equal to or larger than a predetermined value whereas the scanning type is set to progressive scanning when the average value is smaller than the predetermined value;

a converter to convert the incoming interlaced moving picture into a progressive moving picture at a frame rate that is equal to the given frame rate; and a switch to switch the incoming interlaced moving picture and the progressive moving picture for each frame in accordance with the set scanning type.

2. A moving-picture scanning-type conversion method comprising the steps of:

setting a scanning type for each frame of an interlaced moving picture incoming at a given frame rate, in accordance with motion activity of the incoming moving picture, wherein the scanning type is set to interlaced scanning when an average value of the motion activity for each frame is equal to or larger than a predetermined value whereas the scanning type is set to progressive scanning when the average value is smaller than the predetermined value;

converting the incoming interlaced moving picture into a progressive moving picture at a frame rate that is equal to the given frame rate; and switching the incoming interlaced moving picture and the progressive moving picture for each frame in accordance with the set scanning type.

* * * * *